United States Patent Office 3,360,523
Patented Dec. 26, 1967

3,360,523
3,5,6-SUBSTITUTED HYDROURACILS
Harvey M. Loux, Hockessin, Del., assignor to E. I. du Pont de Nemours and Company, Wilmington, Del., a corporation of Delaware
No Drawing. Original application June 17, 1964, Ser. No. 375,958, now Patent No. 3,322,526, dated May 30, 1967. Divided and this application Mar. 30, 1967, Ser. No. 626,928
9 Claims. (Cl. 260—260)

ABSTRACT OF THE DISCLOSURE

The compounds of the invention are of a class of hydrouracils bearing substituents at the 3, 5, and 6 ring positions which are useful herbicides. Typical examples are 5,5 - dichloro-3-isopropyl-6-methoxy-6-methylhydrouracil and 5,5 - dichloro-3-cyclohexyl-6-methoxy - 6 - methylhydrouracil. Also a part of the invention are phenol and substituted phenol complexes of the substituted hydrouracils.

CROSS-REFERENCE

This application is a division of copending application S.N. 375,958, filed June 17, 1964, issued as Patent No. 3,322,526, which in turn is a continuation-in-part of application S.N. 158,567, filed Dec. 11, 1961, and now abandoned. Copending application S.N. 375,958 claims a class of substituted hydrouracils including the novel compounds of this invention as well as additional compounds as herbicides.

DESCRIPTION OF INVENTION

This invention relates to substituted hydrouracils. It is more particularly directed to methods and compositions for using hydrouracils as herbicides.

The hydrouracils to be used according to this invention are those having the formula (1)
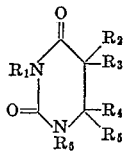

where $R_1$ is alkyl of 1 through 10 carbon atoms, substituted alkyl of 1 through 8 carbon atoms, aryl of 5 through 10 carbon atoms, substituted phenyl, aralkyl of 5 through 13 carbon atoms, substituted aralkyl of 5 through 13 carbon atoms, alkenyl of 3 through 8 carbon atoms, cycloalkyl of 3 through 12 carbon atoms, substituted cycloalkyl of 3 through 13 carbon atoms, cycloalkenyl of 4 through 12 carbon atoms, substituted cycloalkenyl of 4 through 13 carbon atoms, cycloalkyl alkyl of 4 through 13 carbon atoms, cycloalkenyl alkyl of 5 through 13 carbon atoms (substituted cycloalkyl) alkyl of 5 through 14 carbon atoms, or (substituted cycloalkenyl)alkyl of 5 through 14 carbon atoms;

$R_2$ is hydrogen, chlorine, fluorine, bromine, iodine, methyl, ethyl, propyl, butyl, methoxy, ethoxy, propoxy, butoxy, nitro, alkoxymethyl of 2 through 6 carbon atoms, hydroxyalkyl of 1 through 6 carbon atoms, alkylthio of 1 through 4 carbon atoms, or methylthiomethyl;

$R_3$ is chlorine, bromine, fluorine, hydrogen, methyl, or ethyl;

$R_4$ is hydrogen, chlorine, hydroxy, alkoxy of 1 through 6 carbon atoms, halo alkoxy of 1 through 6 carbon atoms, substituted or unsubstituted acyloxy of 1 through 6 carbon atoms, methyl, or ethyl;

$R_5$ is hydrogen, chlorine, bromine, alkyl of 1 through 5 carbon atoms, chloralkyl of 1 through 4 carbon atoms, bromoalkyl of 1 through 4 carbon atoms, or alkoxy of 1 through 5 carbon atoms; and $R_6$ is hydrogen, chlorine, bromine, substituted or unsubstituted alkyl of 1 through 5 carbon atoms, or alkenyl of 2 through 5 carbon atoms;

with the proviso that $R_2$ and $R_5$ can be taken together to form a divalent alkylene bridge of the formula $(CH_2)_n$ where $n$ is 3, 4, or 5 and with the further proviso that said hydrouracil compounds cannot exceed a molecular weight of 500.

For $R_6$, the term "substituted alkyl" is intended to include such radicals as:

bromoalkyl of 1 through 5 carbon atoms
chloroalkyl of 1 through 5 carbon atoms
hydroxyalkyl of 1 through 5 carbon atoms
alkoxyalkyl of 2 through 5 carbon atoms
cyanoalkyl of 2 through 5 carbon atoms Within this scope is a group of novel compounds of the formula (2)
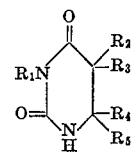

where $R_1$ is alkyl of 3 through 6 carbon atoms, cycloalkyl of 3 through 12 carbon atoms, substituted cycloalkyl of 3 through 13 carbon atoms, cycloalkyl alkyl of 4 through 13 carbon atoms, or (substituted cycloalkyl)alkyl of 5 through 14 carbon atoms;

$R_2$ is chlorine, bromine, fluorine, nitro, methyl, ethyl, hydroxymethyl, methoxymethyl, ethoxymethyl, methoxy, or hydrogen;

$R_3$ is chlorine or bromine;

$R_4$ is alkoxy of 1 through 6 carbon atoms, and $R_5$ is methyl or ethyl.

For $R_1$ in Formulae 1 and 2 above, the term "substituted alkyl" is intended to include such radicals as bromoalkyl of 1 through 8 carbon atoms,
chloroalkyl of 1 through 8 carbon atoms,
hydroxyalkyl of 1 through 8 carbon atoms,
alkoxyalkyl of 2 through 8 carbon atoms,
alkoxy carbonyl alkyl of 3 through 8 carbon atoms, and
cyanoalkyl of 2 through 8 carbon atoms.

Similarly, the terms "aryl" and "substituted phenyl" embrace radicals such as phenyl
furyl
naphthyl
o-biphenylyl
pyridyl,
chlorophenyl,
bromophenyl,
alkoxyphenyl,
dibromophenyl,
fluorophenyl,
trichlorophenyl,
alkylphenyl of 7 through 11 carbon atoms,
dialkylphenyl of 8 through 12 carbon atoms,
chloroalkylphenyl of 7 through 10 carbon atoms, nitrochlorophenyl,
nitrophenyl,
dichloronitrophenyl,
chloroalkoxyphenyl of 7 through 11 carbon atoms,
trifluoromethylphenyl,
tetrahydronaphthyl, and
indenyl.

The terms "aralkyl" and "substituted aralkyl" are intended to include such radicals as furfuryl,
benzyl,
phenylalkyl of 8 through 11 carbon atoms (total),
chlorobenzyl,
dichlorobenzyl,
alkylbenzyl of 8 through 11 carbon atoms (total),
dialkylbenzyl of 9 through 13 carbon atoms (total),
nitrobenzyl,
alkoxybenzyl of 8 through 11 carbon atoms (total), and
naphthylmethyl.

The terms "cycloalkyl," "cycloalkenyl," "cycloalkyl alkyl," and "cycloalkenyl alkyl" will include cyclohexyl,
cyclohexenyl,
cyclohexylalkyl,
cyclohexenylalkyl,
cyclopentyl,
cyclopentenyl,
cyclopentylalkyl,
cyclopentenylalkyl,
norbornyl,
norbornenyl,
norbornylalkyl,
norbornenylalkyl,
bicyclo(2,2,2)octyl,
bicyclo(2,2,2)octenyl,
bicyclo(2,2,2)octylalkyl,
bicyclo(2,2,2)octenylalkyl,
cyclopropyl,
cyclobutyl,
cyclobutylalkyl,
cyclobutenyl,
cyclobutenylalkyl,
hexahydroindanyl,
tetrahydroindanyl,
hexahydroindenyl,
hexahydroindenyl alkyl,
tetrahydroindanyl alkyl,
hexahydroindanyl alkyl,
hexahydro-4,7-methanoindenyl,
tetrahydro-4,7-methanoindanyl,
hexahydro-4,7-methanoindanyl,
hexahydro-4,7-methanoindenyl alkyl,
tetrahydro-4,7-methanoindanyl alkyl,
hexahydro-4,7-methanoindanyl alkyl,
decahydronaphthyl,
decahydronaphthyl alkyl,
tetrahydronaphthyl,
tetrahydronaphthyl alkyl,
decahydro-1,4-methanonaphthyl,
decahydro-1,4-methanonaphthyl alkyl,
octahydro-1,4-methanonaphthyl,
octahydro-1,4-methanonaphthyl alkyl,
decahydro-1,4-5,8-dimethanonaphthyl,
decahydro-1,4-5,8-dimethanonaphthyl alkyl,
octahydro-1,4-5,8-dimethanonaphthyl, and
octahydro-1,4-5,8-dimethanonaphthyl alkyl,
tetrahydrofurfuryl.

These cyclic substituents can be further substituted with alkyl groups of 1 through 4 carbon atoms, methoxy, chlorine, or bromine.

Certain dihydrouracils of Formula 1 also form water stable, novel complexes with phenol and substituted phenols. These complexes have the formula (3)

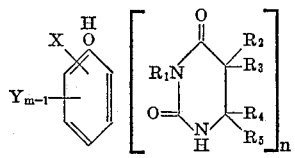

where $R_1$, $R_2$, $R_3$, $R_4$, and $R_5$ are as defined in Formula 2,
X is hydrogen, chlorine, nitro, alkyl of 1 through 3 carbon atoms, bromine or alkoxy of 1 to 3 carbon atoms,
Y is chlorine or alkyl of 1 through 3 carbon atoms,
m is a number 1 through 5, and
n is 1 or 2.

These complexes are also herbicidal, and in this respect, have some advantages over the uracils per se, viz., higher solubility in oils and solvents. They are formulated into herbicidal compositions in the same way as are the uracils themselves.

The hydrouracils of this invention can be prepared according to methods well known to those familiar with pyrimidine chemistry.

One method involves the addition of moieties across the double bond between the 5- and 6-positions of the uracil starting material. The starting materials used according to this method have the general structure (4)

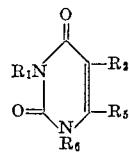

where $R_1$, $R_2$, $R_5$, and $R_6$ are defined as in Formula 1. Preparation of these compounds is described in detail in Patents Nos. 3,235,357, issued Feb. 15, 1966; 3,235,358, issued Feb. 15, 1966; 3,235,362, issued Feb. 15, 1966; and 3,235,363, issued Feb. 15, 1966.

Hypohalous acids and organic hypohalites derived from bromine and chlorine, such as alkyl and acyl hypohalites, add across the double bond according to the following equation:

(5)

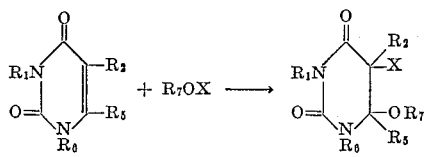

where $R_1$, $R_2$, and $R_5$ are defined as in Formula 1 and $R_6$ is hydrogen or alkyl of 1–5 carbon atoms,
$R_7$ is hydrogen, alkyl of 1 through 6 carbon atoms, acyl of 1 through 6 carbon atoms; and
X is chlorine or bromine.

When $R_7$ in the product is hydrogen or alkyl, the $R_7OX$ reactant is prepared according to the following equation:

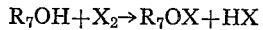
$$R_7OH + X_2 \rightarrow R_7OX + HX$$

When $R_7$ is acyl, it is prepared according to the following equation:

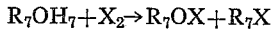
$$R_7OH_7 + X_2 \rightarrow R_7OX + R_7X$$

The preparation of this reactant and its reaction with the uracil starting material is most easily carried out in one step by dissolving or suspending the uracil starting material in an excess of $R_7OH$ or $R_7OR_7$ used as a liquid medium, and passing in a stoichiometric amount of a halogen. The reaction is exothermic and it is necessary to cool the reaction vessel to keep it at room temperature.

In Equation 5, when the 5-position in the uracil starting material is substituted with hydrogen, the resulting compound will have two halogen atoms in the 5-position. In this case, two moles of halogen must be used. When the substituent in the 5-position of the uracil starting material is anything else, only one halogen will be added in the 5-position of the resulting product, as is illustrated in Equation 5.

For a more detailed discussion of the above, see D. J. Brown, The Pyrimidines, Interscience, 1962, pp. 172–174, and J. Am. Chem. Soc. 59, 2436 (1937).

Hydrogen can be added across the double bond by catalytic hydrogenation. This is accomplished by hydrogenating the uracil starting material in a solvent such as ethanol or dioxane under a pressure of about 1700 pounds per square inch and a temperature of about 220° C., using a catalyst such as ruthenium or platinum. This is illustrated by the following equation:

(6)
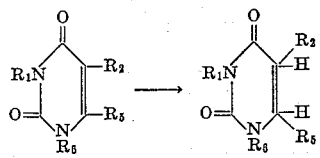

where $R_1$ is as defined in Formula 1,
$R_6$ is alkyl of 1–5 carbons, or hydrogen,
$R_2$ is hydrogen, alkyl of 1–5 carbons, alkoxy of 1–5 carbons, hydroxyalkyl, alkoxyalkyl, or fluorine,
$R_5$ is hydrogen, alkyl of 1–5 carbons, or alkoxy of 1–5 carbons;

with the proviso that $R_2$ and $R_5$ can be taken together to form a divalent alkylene bridge of the formula $(CH_2)_n$ where $n$ is 3, 4 or 5.

The dihydrouracil products from the above reactions are isolated by filtering off resulting precipitates, or if they remain in solution, by stripping off the solvent under reduced pressure.

A second method for preparing dihydrouracils of this invention involves the reaction of an optionally substituted propionate carrying an β-amino group with an isocyanate according to Equation 7.

(7)
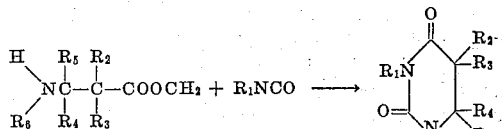

where $R_1$, $R_2$, $R_3$, and $R_5$ are defined as in Formula 1;
$R_4$ is hydrogen, alkyl of 1 through 5 carbon aotms, or alkoxy of 1 through 5 carbon atoms, and
$R_6$ is hydrogen, alkyl of 1 through 5 carbon atoms, or alkenyl of 2 through 5 carbon atoms.

This reaction is carried out by mixing the reactants in an inert solvent such as benzene, toluene, xylene, or cyclohexane. The reaction is spontaneous and exothermic. The solvent is stripped off under reduced pressure and the residue is suspended in a dilute (6 N) aqueous acid such as hydrochloric or sulfuric, in a ratio of about one part of residue to each 20 parts of acid. In some cases hydroxide or alkoxide effects ring closure.

The mixture is boiled for approximately one hour and then evaporated to dryness under reduced pressure to give the desired hydrouracil, which can, if required, be recrystallized from water or such solvents as alcohol, acetonitrile, or nitromethane.

A third method for preparing dihydrouracils of this invention involves the addition of a substituted urea to an α,β-unsaturated acid or derivative thereof according to Equation 8.

(8)
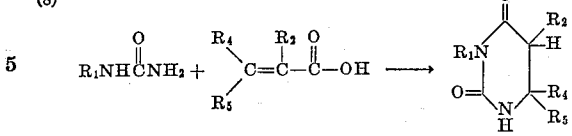

where $R_1$ and $R_2$ are defined as in Formula 1,
$R_4$ is hydrogen, alkoxy of 1–6 carbons, and
$R_5$ is hydrogen, alkyl of 1–5 carbons, with the proviso that $R_2$ and $R_5$ can be taken together to form $(CH_2)_n$ where $n$ is 3, 4, or 5.

This reaction is carried out by heating a mixture of the urea and the α,β-unsaturated compound at 200–250° C. for 1–3 hours. The dihydrouracil is obtained as a glassy material which may be purified by conventional procedures.

This method is further described in D. J. Brown, "The Pyrimidines," Interscience, 1962, pp. 431–434, and Chem. Ber. 34, 3751 (1901).

A fourth method for preparing certain hydrouracils of this invention involves the addition of functional groups to hydrouracils which have been prepared according to the aforementioned procedures. According to this method, functional groups can be modified and exchanged without disturbing the dihydrouracil nucleus. This is demonstrated by the following equation:

(9)
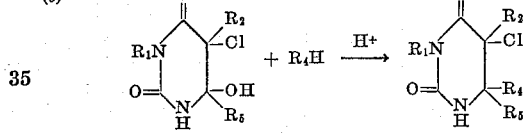

where $R_4$ is $CH_3O-$, $C_2H_5O-$,

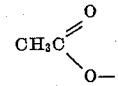

$Cl-$, or $Br-$.

This reaction is carried out by dissolving the dihydrouracil starting material in the reagent-solvent in a ratio of about 1 to 10. In the cases of HCl and HBr, an inert solvent can be used. About 1 to 5%, by weight of the starting hydrouracil, of an acid catalyst should also be present. Suitable catalysts are anhydrous hydrochloric acid, sulfuric acid, and para toluene sulfonic acid. The reactants are allowed to stand at room temperature for from 5 to 25 hours. The product is isolated by stripping off the solvent under reduced pressure to give a solid crystalline material which can be recrystallized from acetonitrile, nitromethane, cyclohexane, or benzene.

In the above equation $R_4H$ can be thionyl chloride or thionyl bromide as well as HCl or HBr in order to effect the conversion of the OH group to chloro or bromo. Certain 5-halogenated dihydrouracils of this invention can be prepared by reacting, for example, chlorine with a substituted dihydrouracial in refluxing glacial acetic acid, illustrated as follows:

(10)
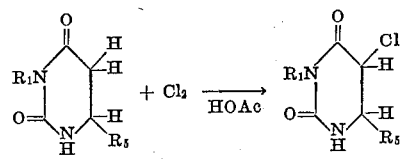

where $R_1$ and $R_5$ are defined as in Formula 1. For further details see J. Org. Chem. 26, 1877 (1961).

Further treatment of a hydrouracil product as shown in Equation 11 with alkaline hypochlorite in aqeuous acetic acid gives the corresponding N-chloro derivative as illustrated by the following reaction scheme:

(11)
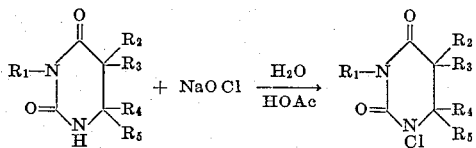

where $R_1$, $R_2$, $R_3$, $R_4$, and $R_5$ are defined as in Formula 1 with the proviso that $R_2$ and $R_3$ cannot be hydrogen.

The $R_6$-hydrogen of the subject dihydrouracils can be also alkylated by conventional procedures to give those hydrouracils where $R_6$ is alkyl or alkenyl. Description of typical alkylation procedures are found in Am. 441, 192 (1952), and Am. Chem. J. 42, 101 (1909).

Further details regarding the preparation of dihydrouracils will be found in Journal Am. Chem. Soc., 59, 2436 (1937); Journal Am. Chem. Soc., 60, 1622 (1938); Journal Biol. Chem., 199, 333 (1952); Monatsh., 64, 333 (1934); Ber., 38, 1689 (1905); Journal Org. Chem. 24, 571 (1959); and D. J. Brown, "The Pyrimidines," Interscience, 1962, pp. 430–445.

The hydrouracils of this invention are excellent herbicides. They are active as agents for either pre- or post-emergence weed control, as soil sterilants, and in soil-foliage applications. They control both annual and perennial broadleaf weeds and grasses such as quackgrass, Johnson grass, crabgrass, foxtail, barnyard grass, bromegrass, broomsedge, pigweed, lamb's-quarters, spurge, purslane and volunteer lespedeza. The compounds can also be used to control young weeds growing in established economic crops having deep root systems, without injury to these crops. Weeds such as mustard, crabgrass, velvet leaf, chickweed, flower of an hour, wild buckwheat, corn cockle, seedling cocklebur, and seedling Johnson grass may be controlled in crops such as corn, flax, and peanuts.

The amounts of hydrouracils to be used in such applications will naturally vary according to the condition of the vegetation, the degree of herbicidal activity desired, the formulation used, the mode of application, the climate, season of the year, rainfall and the like. Recommendations as to precise application rates are therefore not practical. Generally, however, in soil-foliage applications, levels of from 4 to 30 pounds of active material per acre will give satisfactory results. When these compounds are applied as pre- or post-emergence sprays for the control of tender weed seedlings, rates of from ½ to 4 pounds of active ingredient per acre will be sufficient.

The compounds of Formulae 1 and 2 can be used with a carrier or diluent such as a finely divided solid, a solvent liquid of organic origin, water, a wetting agent, a dispersing agent, an emulsifying agent, an aqueous emulsion or any suitable combination of these.

Compositions of the invention, especially liquids and wettable powders, contain as a conditioning agent one or more surface-active agents in amounts sufficient to render a given composition containing the compounds of Formulae 1 and 2 readily dispersible in water or in oil. By the term "surface-active agent," it is understood that wetting agents, dispersing agents, suspending agents and emulsifying agents are included. Compositions of the invention generally contain from 0.5 to 99.5% by weight of one or more compounds of Formulae 1 and 2.

Suitable surface-active agents are set out, for example, in Searle U.S. Patent 2,426,417, Todd U.S. Patent 2,655,447, Jones U.S. Patent 2,412,510, or Lenher U.S. Patent 2,139,276. A detailed list of such agents is set forth by J. W. McCutcheon, "Detergents and Emulsifiers—1963 Annual," and Bulletin E–607 of the Bureau of Entomology and Plant Quarantine of the U.S. Department of Agriculture. In general, less than 10 percent by weight of the surface-active agent is present in the compositions of this invention, although usually the amount of surface-active agent in these compositions is at least 0.5 and not more than 5 percent by weight. However, levels as high as 0.5–6 parts of surfactant for each part of hydrouracil gives unusual and unexpected beneficial results. Such compositions have greater herbicidal effectiveness than can be expected from a consideration of the activity of the components used separately.

Several different types of compositions containing the compounds of Formulae 1 and 2 have been developed so that the compounds of Formulae 1 and 2 can be used to greatest advantage as herbicides. These preferred formulations comprise certain wettable powders, certain aqueous suspensions, certain dusts, certain oil solutions (which may be emulsifiable in water), solutions in certain solvents, certain granules and pellets, and certain high-strength compositions. In general, these preferred compositions will all usually contain a wetting agent, a dispersant, or an emulsifying agent.

Wettable powders are water-dispersible compositions containing the active material, an inert solid extender, and one or more surfactants to provide rapid wetting and prevent heavy flocculation when suspended in water. They are prepared by blending and grinding the ingredients until the particle size is less than 50 microns.

The inert extenders which should be used in the preferred wettable powders of this invention containing the compounds of Formulae 1 and 2 are preferably of mineral origin and the surfactants are preferably anionic or non-ionic.

Suitable surfactants for use in such compositions are listed in "Detergents and Emulsifiers, 1963 Annual" by John W. McCutcheon, Inc. The classes of extenders most suitable for the wettable powder formulations of this invention are the natural clays, diatomaceous earths, and synthetic mineral fillers derived from silica and silicate. Organic diluents and wood flour, walnut shell flour, and the like can also be used. Among non-ionic and anionic surfactants, those most suitable for the preparation of the dry, wettable products of this invention are solid forms of compounds known to the art as wetters and dispersants. Occasionally a liquid, non-ionic compound classified primarily as an emulsifier may serve as both wetter and dispersant.

Most preferred fillers for this invention are kaolinite clay, attapulgite clay, synthetic magnesium silicate, and synthetic fine silicas. Preferred surface-active agents are alkyl benzene and alkyl naphthalene sulfonates, sulfated fatty alcohols, amines, or acid amides, long chain acid esters of sodium isethionate, esters of sodium sulfosuccinate, sulfated or sulfonated fatty acid esters, petroleum sulfonates, sulfonated vegetable oils ditertiary acetylenic glycols. Other preferred surfactants include ethylene oxide condensates with alkylated phenols, with fatty acids, with sorbitan fatty acid esters, and with long chain aliphatic alcohols and thioalcohols. Preferred dispersants are methylated celluloses, polyvinyl alcohols, lignin sulfonates, polymeric alkyl naphthalene sulfonates, sodium naphthalene sulfonate, polymethylene bisnaphthalenesulfonate, and sodium-N-methyl-N-(long chain acid) taurates.

Wetting and dispersing agents in these preferred wettable powder compositions of this invention are usually present at concentrations of from about 0.5 weight percent to 5 weight percent. The inert extender then completes the formulation. Where needed, a portion of the extender may be replaced by corrosion inhibitors antifoaming agents anti-caking agents, bacteriostats, and the like.

Thus, wettable powder formulations of the invention will contain from about 25 to 90 weight percent active material, from 0.5 to 3.0 weight percent wetting agent, from 0.25 to 5.0 weight percent dispersant, and from 2 to 74.25 weight percent inert extender, as these terms are described above.

When the wettable powder contains a corrosion inhibitor or an anti-foaming agent or both, the corrosion inhibitor will not exceed about 1 percent of the composition, and the anti-foaming agent will not exceed about 0.5 percent by weight of the composition, both replacing equivalent amounts of the inert extender.

Aqueous suspensions are prepared by mixing together and sandgrinding or ball milling an aqueous slurry of water-insoluble active ingredient in the presence of dispersing agents to obtain a concentrated slurry of very finely-divided particles, in which the active ingredient is substantially all below 5 microns in size. The resulting concentrated aqueous suspension is characterized by its extremely small particle size, so that when diluted and sprayed coverage is very uniform. Caking preventatives, such as gelling type clays, may also be included to further reduce the settling out of particles.

Thus, aqueous dispersions of the invention will contain from about 20 to 50 weight percent active material, from 2 to 15 weight percent dispersant, from 0 to 3 weight percent caking preventative, and from 32 to 78 weight percent of water preservatives, and corrosion inhibitors can optionally be present up to 3% of the total replacing an equivalent quantity of water.

Dusts are dense powder compositions which are intended for application in dry form, in accordance with the preferred compositions and methods of the invention. Dusts are characterized by their free-flowing and rapid settling properties so that they are not readily windborne to areas where their presence is not desired. They contain primarily an active material and a dense, free-flowing, solid extender.

Their performance is sometimes aided by the inclusion of a wetting agent, and convenience in manufacture frequently demands the inclusion of an inert, absorptive grinding aid. For the compounds of this invention, the inert extender may be either of vegetable or mineral origin, the wetting agent is preferabaly anionic or non-ionic, and suitable absorptive grinding aids are of mineral origin.

Suitable classes of inert solid extenders for use here are those organic or inorganic powders which possess high bulk density and are very free-flowing. They are also characterized by possessing relatively low surface areas and are poor in liquid absorption. Suitable classes of grinding aids are some natural clays, diatomaceous earths, and synthetic mineral fillers derived from silica or silicate. Among an ionic and non-ionic wetting agents, the most suitable are the members of the group known to the art as wetting agents and emulsifiers as listed above. Although solid agents are usually preferred because of ease in incorporation, some liquid non-ionic agents are also suitable in this invention.

Preferred inert solid extenders for the dusts of this invention are micaceous talcs, pyrophyllite, dense kaolin clays, ground calcium phosphate rock such as that known as "Phosphodust" (a trademark of the American Agricultural Chemical Company) and tobacco dust.

Preferred grinding aids are attapulgite clay, diatomaceous silica, synthetic fine silica and synthetic calcium and magnesium silicates. Preferred wetting agents are those previously listed under wettable powder formulations.

The inert solid extenders in the dusts of this invention are usually present in concentrations of from about 30 to 90 weight percent of the total composition. The grinding aid will usually constitute 5 to 50 weight percent of the composition, and the wetting agent will constitute from about 0 to 1.0 weight percent of the composition. Dust compositions can also contain other surfactants such as dispersing agents in concentrations of up to about 0.5 weight percent.

The wettable powders described above may also be used in the preparation of dusts. While such wettable powders could be used directly in dust form, it is more advantageous to dilute them by blending with the dense dust diluent. In this manner, dispersing agents, corrosion inhibitors, and anti-foam agents may also be found as components of a dust.

Thus, the dust compositions of this invention will comprise about 2 to 20 weight percent active material, 0 to 50 weight percent absorptive filler, 0 to 1.0 weight percent wetting agent, and about 30 to 98 weight percent dense, free-flowing dust diluent, as these terms are used herein. Such dust formulations can contain, in addition, minor amounts of dispersants, corrosion inhibitors, and anti-foam agents, which are often derived from the wettable powders used to make the dusts.

Oil solution formulations are usually solutions of active material in non-water miscible solvents. If the solution is to be emulsifiable in water, the solution also contains a surfactant.

For the compounds of this invention, oil solutions can be made by mixing the active ingredient with a solvent, and if it is desired to have an emulsifiable oil, additionally mixing in a surfactant. Suitable solvents for the compounds of this invention are hydrocarbons (which may be aliphatic and/or aromatic, substituted or unsubstituted), and non-water miscible ethers, esters, or ketones. Suitable surfactants are those anionic or non-ionic agents known to the art as emulsifying agents. Such compounds can be found listed in "Detergents and Emulsifiers—1963 Annual," by John W. McCutcheon, Inc.

Emulsifying agents most suitable for the compositions of this invention are alkyl aryl polyethoxy alcohols, alkyl and akyl aryl polyether alcohols, polyoxyethylene sorbitol or sorbitan fatty acid esters, polyethylene glycol fatty esters, fatty alkylol amide condensates, amine salts of fatty alcohol sulfates plus long chain alcohols, oil soluble sulfonates and mixtures of such materials. Such emulsifying agents will comprise from about 1 to 10 weight percent of the total composition. As described above, however, up to 6 parts of emulsifying agent for each part hydrouracil can be used to give excellent herbicidal results.

Preferred solvents include hydrocarbons of the aromatic type such as xylene and heavy aromatic naphthas and ketones such as isophorone. Solvents boiling in the range of 125–400° C. are preferred.

Thus, emulsifiable oil compositions of the present invention will usually consist of from about 15 to 50 weight percent active material, about 40 to 83 weight percent solvent, and about 2 to 10 weight percent emulsifier, as these terms are defined and used above.

Granules or pellets are physically stable, particulate compositions containing active material (here, the compounds of Formulae 1 and 2) adhering to or distributed through a basic matrix of a coherent, inert carrier with macroscopic dimensions. In order to aid leaching of active from the granule, a surfactant is usually present.

For the compounds of this invention, the inert carrier is preferably of mineral origin, and the surfactant is a compound known to the art as a wetting agent. Such compounds are listed by J. B. McCutcheon in "Detergents and Emulsifiers—1963 Annual."

Suitable carriers are natural clays, some pyrophyllites and vermiculite. Suitable wetting agents are anionic or non-ionic.

For the granule compositions of this invention, most suitable carriers are of two types. The first are porous, absorptive, preformed granules, such as preformed and screened granular attapulgite or heat expanded, granular, screened vermiculite. On either of these, a solution or a suspension of the active agent can be sprayed and will be absorbed at concentrations up to 25 weight percent of the total weight. The second suitable types are initially powdered kaolin clays, hydrated attapulgite, or bentonitic clays, either sodium, calcium, or magnesium bentonites. These are blended with the active components to give mixtures that are granulated and dried to yield granular material with the active component distributed uniformly throughout the mass. Such granules can also be made with 20 to 30 weight percent active component, but more frequently a concentration of about 10 weight percent is desired for optimum distribution. The granular compositions of this invention are most useful in a size range of 15 to 30 mesh.

The most suitable wetting agents for the granular compositions of this invention depend upon the type of granule used. When preformed granules are sprayed with active material in liquid form, the most suitable wetting agents are non-ionic, liquid wetters miscible with the solvent. These are compounds more generally known to the art as emulsifiers, and comprise alkyl aryl polyether alcohols, alkyl polyether alcohols, polyoxyethylene sorbitol or sorbitan fatty acid esters, polyethylene glycol fatty esters, fatty alkylol amide condensates and oil soluble petroleum or vegetable oil sulfonates. Such agents will usually comprise from about 0 to 5 weight percent of the total composition.

When the active is first mixed with a powdered carrier and subsequently granulated, liquid non-ionic wetters can still be used, but it is usually preferable to incorporate at the mixing stage one of the solid, powdered anionic wetting agents such as those previously listed for the wettable powders. Such agents will comprise from about 0 to 2 weight percent of the total composition.

Thus, the preferred granular formulations of this invention comprise 15 to 30 mesh granules containing from about 5 to 30 weight percent active material, about 0 to 5 weight percent wetting agent, and about 65 to 95 weight percent inert mineral carrier, as these terms are used herein.

Pellets can be made by mixing the finely-divided uracils of this invention with suitable clay along with such optional ingredients as anhydrous salts, wetting agents, and dispersing agents. This mixture is moistened with 10–25% by weight of water and is then extruded through a suitable die, under pressure. The extrusions are cut into predetermined lengths and then dried. These pellets can be granulated if desired.

Preferred clays are of the bentonite, sub-bentonite, or kaolin type although a portion of these may be replaced with montmorillonite or attapulgite when more absorptive pellets are desired.

The preferred anhydrous salt is sodium sulfate, otherwise known as salt cake, and the preferred wetting and dispersing agents are those listed above for wettable powder formulations. These optional ingredients aid in wetting and breakup of the pellets after application.

Thus, the preferred pellet formulations of this invention will contain from 0.5–30% of active material, from 5–15% of anhydrous sodium sulfate, from 0.5–5.0% of surface active agents and from 50–94% of clay diluent.

High-strength compositions containing from 90–99.5% of active material and 0.5–10.0% of a surface active agent can be prepared. The surface active agent should be primarily a wetting agent but it may also have dispersing or emulsifying properties. Preferred surface active agents are polyethylene glycol ethers of long-chain alcohols or alkylated phenols. Preferred diluents are synthetic fine silicas, finely divided silicates, and finely divided clays such as kaolinite, attapulgites, and montmorillonites. These diluents may serve as anti-caking agents.

These high-strength compositions are suitable for preparation of a variety of formulations. For example, oil solutions can be prepared by addition of the high-strength compositions to aromatic-type solvents and to herbicidal oils. Wettable powder, pellets, and granular compositions can be prepared as described above with the high-strength composition replacing the active in the examples.

The hydrouracils can be combined with other known herbicides to give compositions which have advantages over the individual components. Among the known herbicides which can be combined with the hydrouracils are:

SUBSTITUTED UREAS 3-(3,4-dichlorophenyl)-1,1-dimethylurea
3-(4-chlorophenyl)-1,1-dimethylurea
3-phenyl-1,1-dimethylurea
3-(3,4-dichlorophenyl)-3-methoxy-1,1-dimethylurea
3-(4-chlorophenyl)-3-methoxy-1,1-dimethylurea
3-(3,4-dichlorophenyl)-1-n-butyl-1-methylurea
3-(3,4-dichlorophenyl)-1-methoxy-1-methylurea
3-(4-chlorophenyl)-1-methoxy-1-methylurea
3-(3,4-dichlorophenyl)-1,1,3-trimethylurea
3-(3,4-dichlorophenyl)-1-diethylurea
3-(p-chlorophenoxyphenyl)-1,1-dimethylurea
N-(3-trifluoromethylphenyl)-N'N'-dimethylurea These ureas can be mixed with the hydrouracils in proportions of from 1:4 to 4:1, respectively, the preferred ratio being 1:2 to 2:1.

SUBSTITUTED TRIAZINES 2-chloro-4,6-bis(ethylamino)-s-triazine
2-chloro-4-ethylamino-6-isopropylamino-s-triazine
2-chloro-4,6-bis(methoxypropylamino)-s-triazine
2-methoxy-4,6-bis(isopropylamino)-s-triazine
2-diethylamino-4-isopropylacetamido-6-methoxy-s-triazine
2-isopropylamino-4-methoxyethylamino-6-methylmercapto-s-triazine
2,4-bis-(3-methoxypropylamino)-6-methylmercapto-s-triazine
2-methylmercapto-4,6-bis(isopropylamino-s-triazine
2-methylmercapto-4,6-bis(ethylamino)-s-triazine
2-methylmercapto-4-ethylamino-6-isopropylamino-s-triazine
2-methoxy-4,6-bis-(ethylamino)-s-triazine
2-methoxy-4-ethylamino-6-isopropylamino-s-triazine
2-chloro-4,6-bis(isopropylamino)-s-triazine These triazines can be mixed with the hydrouracils in proportions of from 1:4 to 4:1, respectively, the preferred ratio being 1:2 to 2:1.

PHENOLS

Dinitro-o-sec-butylphenol and its salts
Pentachlorophenol and its salts

These phenols can be mixed with the hydrouracils in proportions of 1:10 to 20:1, respectively, the preferred ratio being 1:5 to 5:1.

CARBOXYLIC ACIDS AND DERIVATIVES

The following carboxylic acids and derivatives can be mixed with the hydrouracils in the listed proportions:

2,3,6-trichlorobenzoic acid and its salts
2,3,5,6-tetrachlorobenzoic acid and its salts
2-methoxy-3,5,6-trichlorobenzoic acid and its salts
2-methoxy-3,6-dichlorobenzoic acid and its salts
3-amino-2,5-dichlorobenzoic acid and its salts
3-nitro-2,5-dichlorobenzoic acid and its salts
2,4-dichlorophenoxyacetic acid and its salts and esters
2,4,5-trichlorophenoxyacetic acid and its salts and esters
(2-methyl-4-chlorophenoxy)acetic acid and its salts and esters
2-methyl-3,6-dichlorobenzoic acid and its salts
2,3,6-trichlorobenzyloxypropanol
2-(2,4,5-trichlorophenoxy)propionic acid and its salts and esters
2-(2,4,5-trichlorophenoxy)ethyl-2,2-dichloropropionate
4-(2,4-dichlorophenoxy)butyric acid and its salts and esters
4-(2-methyl-4-chlorophenoxy)butyric acid and its salts and esters Mixed in a 1:16 to 8:1 ratio, preferably a 1:4 to 4:1 ratio.

2,6-dichlorobenzonitrile: Mixed in a 1:4 to 4:1 ratio, preferably a 1:3 to 3:1 ratio.

Trichloroacetic acid and its salts: Mixed in a 1:2 to 25:1 ratio, preferably a 1:1 to 8:1 ratio.

2,2-dichloropropionic acid and its salts: Mixed in a 1:4 to 8:1 ratio, preferably a 1:2 to 4:1 ratio.

N,N-di(n-propyl)thiolcarbamic acid, ethyl ester; N,N-di(n-propyl)thiolcarbamic acid, n-propyl ester; N-ethyl- N-(n-butyl)thiolcarbamic acid, ethyl ester; N-ethyl-N-(n-butyl)thiolcarbamic acid, n-propyl ester: Mixed in a 1:2 to 24:1 ratio, preferably a 1:1 to 12:1 ratio.

N-phenylcarbamic acid, isopropyl ester; N-(m-chlorophenyl)carbamic acid, isopropyl ester; N-(m-chlorophenyl)carbamic acid, 4-chloro-2-butynyl ester: Mixed in a 1:2 to 24:1 ratio, preferably a 1:1 to 12:1 ratio.

2,3,6-trichlorophenylacetic acid and its salts: Mixed in a 1:12 to 8:1 ratio, preferably a 1:4 to 4:1 ratio.

2 - chloro - N,N - diallylacetamide; maleic hydrazide: Mixed in a 1:2 to 10:1 ratio, preferably a 1:1 to 5:1 ratio.

INORGANIC AND MIXED INORGANIC-ORGANIC SALTS

These salts can be mixed with the hydrouracils in the listed proportions.

Calcium propylarsonate, disodium monomethylarsonate, octyl-dodecylammoniummethylarsonate, dimethylarsinic acid:: Mixed in a 1:4 to 4:1 ratio, preferably a 1:2 to 2:1 ratio.

Sodium arsenite: Mixed in a 1:5 to 40:1 ratio, preferably a 1:4 to 25:1 ratio.

Lead arsenate, calcium arsenate: Mixed in a 150:1 to 600:1 ratio, preferably a 100:1 to 400:1 ratio.

Sodium tetraborate hydrated, granulated, sodium metaborate, sodium pentaborate, polyborchlorate, unrefined borate ore such as borascu: Mixed in a 3:1 to 120:1 ratio, preferably a 6:1 to 60:1 ratio.

Ammonium thiocyanate: Mixed in a 1:10 to 20:1 ratio, preferably a 1:5 to 5:1 ratio.

Sodium chlorate: Mixed in a 1:1 to 40:1 ratio, preferably a 2:1 to 20:1 ratio.

Ammonium sulfamate: Mixed in a 1:1 to 100:1 ratio, preferably a 1:1 to 50:1 ratio.

OTHER ORGANIC HERBICIDES 5,6 - dihydro - (4A,6A) - dipyrido - (1,2-A,2',1'-C), pyrazinium dibromide: Mixed in a 1:20 to 16:1 ratio, preferably a 1:5 to 5:1 ratio.

3-amino-1,2,4-triazole: Mixed in a 1:20 to 20:1 ratio, preferably a 1:5 to 5:1 ratio.

3,6-endoxohexahydrophthalic acid: Mixed in a 1:3 to 20:1 ratio, preferably a 1:2 to 10:1 ratio.

Hexachloroacetone: Mixed in a 1:2 to 16:1 ratio, preferably a 1:1 to 8:1 ratio.

Diphenylacetonitrile, N,N-dimethyl - α,α - diphenylacetamide, N,N - di - n - propyl - 2,6 - dinitro - 4 - trifluoromethylaniline, N,N - di - n - propyl - 2,6 - dinitro-4-methylaniline: Mixed in a 1:10 to 30:1 ratio, preferably a 1:5 to 20:1 ratio.

O - (2,4 - dichlorophenyl) - O - methyl - isopropylphosphoramidothiate, 2,3,5,6 - tetrachloroterephthalic acid, dimethyl ester: Mixed in a 1:4 to 20:1 ratio, preferably a 1:3 to 15:1 ratio.

2,4 - dichloro - 4' - nitrodiphenyl ether: Mixed in a 1:10 to 30:1 ratio, preferably a 1:5 to 20:1 ratio.

OTHER SUBSTITUTED URACILS

The hydrouracils can also be combined with other substituted uracils, in the proportions listed below. Methods for the preparation of the listed uracils which are novel can be found in Patents Nos. 3,245,357, issued Feb. 15, 1966, and 3,235,360, issued Feb. 15, 1966.

5-bromo-3-isopropyl-6-methyluracil and salts
5-chloro-3-ispropyl-6-methyluracil and salts
5-bromo-3-sec-butyl-6-methyluracil and salts
3-sec-butyl-5-chloro-6-methyluracil and salts
5-bromo-3-cyclohexyl-6-methyluracil and salts
5-chloro-3-cyclohexyl-6-methyluracil and salts
5-bromo-3-tert-butyl-6-methyluracil
3-tert-butyl-5-chloro-6-methyluracil Mixed in a 1:4 to 4:1 ratio, preferably a 1:2 to 2:1 ratio.

3-cyclohexyl-6-methyluracil
3-cyclohexyl-6-ethyluracil
6-sec-butyl-3-cyclohexyluracil
3-cyclohexyl-6-propyluracil
3-cyclopentyl-6-methyluracil Mixed in a 1:4 to 4:1 ratio, preferably a 1:2 to 2:1 ratio.

3-cyclohexyl-5,6-trimethyleneuracil
3-sec-butyl-5,6-trimethyleneuracil
3-isopropyl-5,6-trimethyleneuracil
3-isopropyl-5,6-tetramethyleneuracil
3-isopropyl-5,6-pentamethyleneuracil Mixed in a 1:6 to 6:1 ratio, preferably a 1:4 to 4:1 ratio.

5-bromo-3-cyclohexyluracil
5-chloro-3-cyclohexyluracil
5-bromo-3-isopropyluracil
5-bromo-3-sec-butyluracil
3-sec-butyl-5-chlorouracil Mixed in a 1:6 to 6:1 ratio, preferably a 1:2 to 2:1 ratio.

5-bromo-3-isopropyl-6-methyl-1-trichloromethylthiouracil
5-bromo-3-cyclohexyl-6-methyl-1-trichloromethylthiouracil
1-acetyl-5-bromo-3-sec-butyl-6-methyluracil
1-acetyl-5-bromo-3-isopropyl-6-methyluracil
5-chloro-3-isopropyl-6-methyl-1-trichloromethylthiouracil mixed in a 1:4 to 4:1 ratio, preferably a 1:2 to 2:1 ratio.

This invention will be more easily understood and readily practiced by referring to the following illustrative examples:

EXAMPLE 1

*Preparation of 3-sec-butyl-5,5-dichloro-6-methoxy-6-methylhydrouracil*

A mixture of 192 parts of 3-sec-butyl-6-methyluracil and 1000 parts of methanol is stirred beneath a nitrogen blanket as 142 parts of gaseous chlorine are gradually added. The exothermic reaction is maintained at 25° C. with a cooling bath. The addition of the chlorine is completed in about 1 hour, and the reaction mixture is stirred at 25° C. for an additional 2 hours.

The resulting slurry is concentrated at reduced pressure to about one-third of its original volume, chilled in an ice bath, and filtered. The resulting white solid, 3 - sec-butyl-5,5-dichloro-6-methoxy-6-methylhydrouracil, M.P. 144° C. to 147° C. is sufficiently pure for formulation as an herbicide.

The compounds in the following table are prepared in a similar fashion by substituting the listed reactants for those specified above.

| Substituted Uracil | Parts by weight | Alcohol | Halogen | Parts by weight | Substituted Hydrouracil Product |
|---|---|---|---|---|---|
| 3-propyl-6-methyluracil | 168 | Methanol | Chlorine | 142 | 5,5-dichloro-6-methoxy-6-methyl-3-propylhydrouracil. |
| 3-isopropyl-6-methyluracil | 168 | ____do____ | ____do____ | 142 | 5,5-dichloro-6-methoxy-6-methyl-3-isopropylhydrouracil. |
| Do | 168 | Isopropanol | ____do____ | 142 | 5,5-dichloro-6-isopropoxy-6-methyl-3-isopropylhydrouracil. |
| 5,6-dimethyl-3-isopropyluracil | 182 | Methanol | ____do____ | 71 | 5-chloro-5,6-dimethyl-6-methoxy-3-isopropylhydrouracil. |
| Do | 182 | ____do____ | Bromine | 160 | 5-bromo-5,6-dimethyl-6-methoxy-3-isopropylhydrouracil. |
| 3-isopropyl-6-methyluracil | 168 | Butanol | Chlorine | 142 | 6-butoxy-5,5-dichloro-6-methyl-3-isopropylhydrouracil. |
| Do | 168 | Cyclohexanol | ____do____ | 142 | 5,5-dichloro-6-cyclohexyloxy-6-methyl-3-isopropylhydrouracil. |
| 3-isopropyl-6-ethyluracil | 182 | Methanol | ____do____ | 142 | 5,5-dichloro-6-ethyl-6-methoxy-3-isopropylhydrouracil. |
| 3-isopropyl-5-ethyl-6-methyluracil | 196 | ____do____ | ____do____ | 71 | 5-chloro-5-ethyl-6-methoxy-6-methyl-3-isopropylhydrouracil. |
| 3-isopropyl-6-methyl-5-nitrouracil | 213 | ____do____ | ____do____ | 71 | 5-methoxy-6-methyl-5-nitro-3-isopropylhydrouracil. |
| 3-isopropyl-5-methoxy-6-methyluracil | 198 | ____do____ | ____do____ | 71 | 5-chloro-5,6-dimethoxy-6-methyl-3-isopropylhydrouracil. |

| Substituted Uracil | Parts by weight | Alcohol | Halogen | Parts by weight | Substituted Hydrouracil Product |
|---|---|---|---|---|---|
| 3-butyl-6-methyluracil | 182 | do | do | 142 | 3-butyl-5,5-dichloro-6-methoxy-6-methylhydrouracil. |
| 3-sec-butyl-6-methyluracil | 182 | do | do | 142 | 3-sec-butyl-5,5-dichloro-6-methyl-6-methoxyhydrouracil. |
| 3-butyl-5,6-dimethyluracil | 196 | do | Bromine | 160 | 5-bromo-3-butyl-5,6-dimethyl-6-methoxyhydrouracil. |
| 3-tert-butyl-6-methyluracil | 182 | do | Chlorine | 142 | 3-tert-butyl-5,5-dichloro-6-methoxy-6-methylhydrouracil. |
| Do | 182 | Ethanol | do | 142 | 3-tert-butyl-5,5-dichloro-6-ethoxy-6-methylhydrouracil. |
| Do | 182 | do | do | 142 | 3-sec-butyl-5,5-dichloro-6-ethoxy-6-methylhydrouracil. |
| Do | 182 | n-Butanol | do | 142 | 3-sec-butyl-6-butoxy-5,5-dichloro-6-methylhydrouracil. |
| Do | 182 | n-Hexanol | do | 142 | 3-sec-butyl-5,5-dichloro-6-n-hexyloxy-6-methylhydrouracil. |
| 3-sec-butyl-5,6-dimethyluracil | 196 | Methanol | Bromine | 160 | 5-bromo-3-sec-butyl-5,6-dimethyl-6-methoxyhydrouracil. |
| 3-sec-butyl-6-methyl-5-nitrouracil | 227 | Ethanol | Chlorine | 71 | 3-sec-butyl-5-chloro-6-ethoxy-6-methyl-5-nitrohydrouracil. |
| 3-norbornenylmethyl-6-methyluracil | 232 | 2-chloroethanol | do | 142 | 6-chloroethyl-5,5-dichloro-6-methyl-3-norbornenylmethylhydrouracil. |
| 3-(4-methoxycyclohexyl)-6-chlorouracil | 227 | Methanol | do | 142 | 6-methoxy-3-(4-methoxycyclohexyl)-5,5,6-trichlorohydrouracil. |
| 6-amyl-5-butoxy-3-isopropyluracil | 299 | do | do | 71 | 6-amyl-5-butoxy-5-chloro-6-methoxy-3-isopropylhydrouracil. |
| 3-isobutyl-6-methyluracil | 182 | do | do | 142 | 3-isobutyl-5,5-dichloro-6-methoxy-6-methylhydrouracil. |
| 3-(3-pentyl)-6-methyluracil | 196 | do | do | 142 | 5,5-dichloro-6-methoxy-6-methyl-3-(3-pentyl)hydrouracil. |
| 3-pentyl-6-methyluracil | 196 | n-Butanol | do | 142 | 6-n-butoxy-5,5-dichloro-6-methyl-3-pentylhydrouracil. |
| 3-(2-methylbutyl)-6-methyluracil | 196 | Ethanol | do | 142 | 5,5-dichloro-6-ethoxy-6-methyl-3-(2-methylbutyl)hydrouracil. |
| 3-hexyl-6-methyluracil | 210 | Methanol | do | 142 | 5,5-dichloro-6-methoxy-6-methyl-3-hexylhydrouracil. |
| 3-(2-methylpentyl)-6-methyluracil | 210 | Ethanol | do | 142 | 5,5-dichloro-6-ethoxy-6-methyl-3-(2-methylpentyl)hydrouracil. |
| 3-(3-methylpentyl)-6-methyluracil | 210 | Methanol | do | 142 | 5,5-dichloro-6-methoxy-6-methyl-3-(3-methylpentyl)hydrouracil. |
| 3-cyclopentyl-6-methyluracil | 194 | do | do | 142 | 3-cyclopentyl-5,5-dichloro-6-methoxy-6-methylhydrouracil. |
| Do | 194 | Isopropanol | do | 142 | 3-cyclopentyl-5,5-dichloro-6-methyl-6-isopropoxyhydrouracil. |
| 3-cyclopentyl-5,6-dimethyluracil | 208 | Methanol | do | 71 | 5-chloro-3-cyclopentyl-5,6-dimethyl-6-methoxyhydrouracil. |
| 5-butyl-3-propyl-6-isopropyluracil | 200 | do | do | 71 | 5-butyl-5-chloro-3-propyl-6-isopropyl-6-methoxyhydrouracil. |
| 3-cyclohexyl-6-methyluracil | 208 | do | do | 142 | 3-cyclohexyl-5,5-dichloro-6-methoxy-6-methylhydrouracil. |
| 3-cyclohexyl-5,6-dimethyluracil | 222 | do | Bromine | 160 | 5-bromo-3-cyclohexyl-5,6-dimethyl-6-methoxyhydrouracil. |
| 3-cyclohexyl-6-methyluracil | 208 | Ethanol | Chlorine | 142 | 3-cyclohexyl-5,5-dichloro-6-ethoxy-6-methylhydrouracil. |
| Do | 208 | n-Butanol | do | 142 | 6-n-butoxy-3-cyclohexyl-5,5-dichloro-6-methylhydrouracil. |
| Do | 208 | n-Pentanol | do | 142 | 3-cyclohexyl-5,5-dichloro-6-methyl-6-n-pentoxyhydrouracil. |
| Do | 208 | Cyclohexanol | do | 142 | 6-cyclohexyloxy-3-cyclohexyl-5,5-dichloro-6-methylhydrouracil. |
| Do | 222 | Methanol | do | 142 | 3-cyclohexyl-5,5-dichloro-6-ethyl-6-methoxyhydrouracil. |
| 3-cyclohexyl-6-methyl-5-nitrouracil | 253 | Ethanol | do | 71 | 5-chloro-3-cyclohexyl-6-ethoxy-6-methyl-5-nitrohydrouracil. |
| 3-cycloheptyl-6-methyluracil | 222 | do | do | 142 | 3-cycloheptyl-5,5-dichloro-6-ethoxy-6-methylhydrouracil. |
| 3-cyclooctyl-6-methyluracil | 236 | Methanol | do | 142 | 3-cyclooctyl-5,5-dichloro-6-methoxy-6-methylhydrouracil. |
| 6-methyl-3-phenyluracil | 202 | do | do | 142 | 5,5-dichloro-6-methoxy-6-methyl-3-phenylhydrouracil. |
| Do | 202 | Propanol | do | 142 | 5,5-dichloro-6-methyl-3-phenyl-6-n-propoxyhydrouracil. |
| Do | 202 | Ethanol | do | 142 | 6-ethoxy-5,5-dichloro-6-methyl-3-phenylhydrouracil. |
| Do | 202 | Cyclohexanol | do | 142 | 6-cyclohexyloxy-5,5-dichloro-6-methyl-3-phenylhydrouracil. |
| 5,6-dimethyl-3-phenyluracil | 216 | Ethanol | do | 71 | 5-chloro-5,6-dimethyl-6-ethoxy-3-phenylhydrouracil. |
| 6-methyl-3-p-tolyluracil | 216 | Methanol | do | 142 | 5,5-dichloro-6-methoxy-6-methyl-3-p-tolylhydrouracil. |
| 3-p-chlorophenyl-6-methyluracil | 236.5 | Ethanol | do | 142 | 3-p-chlorophenyl-5,5-dichloro-6-ethoxy-6-methylhydrouracil. |
| 3-p-nitrophenyl-6-methyluracil | 247 | Methanol | do | 142 | 5,5-dichloro-6-methoxy-6-methyl-3-p-nitrophenylhydrouracil. |
| 5,6-dimethyl-3-phenyluracil | 216 | do | Bromine | 160 | 5-bromo-5,6-dimethyl-6-methoxy-3-phenylhydrouracil. |
| 3-sec-butyl-6-ethyluracil | 196 | Ethanol | Chlorine | 142 | 3-sec-butyl-5,5-dichloro-6-ethoxy-6-ethylhydrouracil. |
| 3-isopropyl-5-methoxymethyluracil | 212 | Methanol | do | 71 | 5-chloro-3-isopropyl-6-methoxy-5-methoxymethyl-6-methylhydrouracil. |
| 5-fluoro-3-isopropyl-6-methyluracil | 186 | do | do | 71 | 5-chloro-5-fluoro-3-isopropyl-6-methoxy-6-methylhydrouracil. |
| 5-ethoxymethyl-3-isopropyl-6-methyluracil | 226 | do | do | 71 | 5-chloro-5-ethoxymethyl-3-isopropyl-6-methoxy-6-methylhydrouracil. |
| 3-sec-butyl-5-ethoxymethyl-6-ethyluracil | 254 | do | do | 71 | 3-sec-butyl-5-chloro-5-ethoxymethyl-6-ethyl-6-methoxyhydrouracil. |
| 3-cyclohexyl-5-methoxymethyl-6-methyluracil | 252 | do | do | 71 | 5-chloro-3-cyclohexyl-6-methoxy-5-methoxymethyl-6-methylhydrouracil. |
| 3-cyclohexyl-5-fluoro-6-methyluracil | 226 | do | do | 71 | 5-chloro-3-cyclohexyl-5-fluoro-6-methoxy-6-methylhydrouracil. |
| 3-cyclohexyl-5-hydroxymethyl-6-methyluracil | 238 | do | do | 71 | 5-chloro-3-cyclohexyl-5-hydroxymethyl-6-methoxy-6-methylhydrouracil. |
| 3-isopropyl-5-hydroxymethyl-6-methyluracil | 200 | do | do | 71 | 5-chloro-5-hydroxymethyl-3-isopropyl-6-methoxy-6-methylhydrouracil. |
| 5-hydroxymethyl-6-methyl-3-phenyluracil | 232 | do | do | 71 | 5-chloro-5-hydroxymethyl-6-methoxy-6-methyl-3-phenylhydrouracil. |
| 5-methoxymethyl-6-methyl-3-phenyluracil | 246 | do | do | 71 | 5-chloro-6-methoxy-5-methoxymethyl-6-methyl-3-phenylhydrouracil. |
| 3-allyl-5-methylthio-6-ethyluracil | 240 | 3-chlorobutanol | do | 71 | 3-allyl-5-chloro-6-(3-chlorobutoxy)-5-methylthio-6-ethylhydrouracil. |
| 5-fluoro-6-methyl-3-phenyluracil | 220 | Methanol | do | 71 | 5-chloro-5-fluoro-6-methoxy-6-methyl-3-phenylhydrouracil. |
| 6-ethyl-3-isopropyl-5-methoxymethyluracil | 226 | do | do | 71 | 5-chloro-6-ethyl-3-isopropyl-6-methoxy-5-methoxymethylhydrouracil. |
| 1,6-dimethyl-3-fenchyluracil | 290 | Propanol | do | 142 | 5,5-dichloro-1,6-dimethyl-3-fenchyl-6-propoxyhydrouracil. |
| 3-cyclohexylmethyl-1-ethyl-6-methyluracil | 250 | Ethanol | Bromine | 320 | 5,5-dibromo-3-cyclohexylmethyl-6-ethoxy-1-ethyl-6-methylhydrouracil. |
| 3-phenyl-6-methyluracil | 202 | Water | do | 320 | 5,5-dibromo-6-hydroxy-6-methyl-3-phenylhydrouracil. |
| 3-cyclohexylmethyl-6-methyluracil | 222 | Methanol | Chlorine | 142 | 5,5-dichloro-3-cyclohexylmethyl-6-methoxy-6-methylhydrouracil. |
| 1-allyl-3-phenyl-6-methyluracil | 243 | do | do | 142 | 1-allyl-3-phenyl-5,5-dichloro-6-methoxy-6-methylhydrouracil. |
| 1-(2-pentenyl)-3-cyclohexylmethyl-6-methyluracil | 290 | Ethanol | do | 142 | 1-(2-pentenyl)-3-cyclohexyl-5,5-dichloro-6-ethoxy-6-methylhydrouracil. |
| 1-(3-butenyl)-3-cyclohexyl-6-methyluracil | 263 | Methanol | Bromine | 320 | 1-(3-butenyl)-3-cyclohexyl-5,5-dibromo-6-methoxy-6-methylhydrouracil. |
| 1-bromomethyl-3-sec-butyl-6-methyluracil | 276 | do | Chlorine | 142 | 1-bromomethyl-3-sec-butyl-5,5-dichloro-6-methoxy-6-methylhydrouracil. |
| 1-(3-chloropentyl)-3-cyclopentyl-6-methyluracil | 300 | Isopropanol | do | 142 | 1-(3-chloropentyl)-3-cyclopentyl-5,5-dichloro-6-isopropoxy-6-methylhydrouracil. |
| 3-benzyl-6-methyluracil | 216 | Methanol | do | 142 | 3-benzyl-5,5-dichloro-6-methoxy-6-methylhydrouracil. |
| Do | 216 | Ethanol | do | 142 | 3-benzyl-5,5-dichloro-6-ethoxy-6-methylhydrouracil. |
| 3-(cyclohexylmethyl)-6-methyluracil | 222 | Methanol | do | 142 | 5,5-dichloro-3-(cyclohexylmethyl)-6-methoxy-6-methylhydrouracil. |

EXAMPLE 2

*Preparation of 3-sec-butyl-5,6-trimethylenehydrouracil*

A mixture of 208 parts of 3-sec-butyl-5,6-trimethyleneuracil, 18.5 parts of 5% ruthenium on carbon and 7300 parts of dioxane is charged into an autoclave and shaken in hydrogen at a pressure of 1000 p.s.i. and a temperature of 200° C. for 3 hours. The reaction mixture is filtered free of suspended catalyst while hot, and the resulting solution is concentrated to about one-tenth of its volume at reduced pressure.

The solution is cooled, and the solid which precipitates is filtered off and recrystallized from acetonitrile. The resulting white, solid 3-sec-butyl-5,6-trimethylenehydrouracil melts at 131–134° C.

The compounds in the following table are similarly prepared by substituting the listed uracil starting material for 3-sec-butyl-5,6-trimethyleneuracil.

| Uracil Starting Material | Parts By Weight | Hydrouracil Product |
| --- | --- | --- |
| 5,6-dimethyl-3-butyluracil | 196 | 5,6-dimethyl-3-butylhydrouracil. |
| 5,6-dimethyl-3-sec-butyluracil | 196 | 5,6-dimethyl-3-sec-butylhydrouracil. |
| 5,6-dimethyl-3-(2-methylbutyl)uracil | 210 | 5,6-dimethyl-3-(2-methylbutyl)hydrouracil. |
| 5,6-dimethyl-3-pentyluracil | 210 | 5,6-dimethyl-3-pentylhydrouracil. |
| 3-cyclohexyl-5,6-dimethyluracil | 224 | 3-cyclohexyl-5,6-dimethylhydrouracil. |
| 5,6-dimethyl-3-isopropyluracil | 182 | 5,6-dimethyl-3-isopropylhydrouracil. |
| 3-(2-methylbutyl)-5,6-trimethyleneuracil | 222 | 3-(2-methylbutyl)-5,6-trimethylenehydrouracil. |
| 3-cyclohexyl-5,6-trimethyleneuracil | 236 | 3-cyclohexyl-5,6-trimethylenehydrouracil. |
| 3-isopropyl-5,6-tetramethyleneuracil | 208 | 3-isopropyl-5,6-tetramethylenehydrouracil. |
| 3-cyclohexyl-5,6-tetramethyleneuracil | 250 | 3-cyclohexyl-5,6-tetramethylenehydrouracil. |
| 6-methyl-3-phenyl-5-propyluracil | 244 | 6-methyl-3-phenyl-5-propylhydrouracil. |
| 5-butyl-3-phenyluracil | 243 | 5-butyl-3-phenylhydrouracil. |
| 3-sec-butyl-5,6-tetramethyleneuracil | 222 | 3-sec-butyl-5,6-tetramethylenehydrouracil. |
| 3-isopropyl-5,6-pentamethyleneuracil | 222 | 3-isopropyl-5,6-pentamethylenehydrouracil. |
| 6-ethyl-3-isopropyl-5-methyluracil | 196 | 6-ethyl-3-isopropyl-5-methylhydrouracil. |
| 3-cyclohexyl-6-ethyl-5-methyluracil | 238 | 3-cyclohexyl-6-ethyl-5-methylhydrouracil. |
| 5-hydroxymethyl-3-isopropyl-6-methyluracil | 186 | 5-hydroxymethyl-3-isopropyl-6-methylhydrouracil. |
| 3-sec-butyl-5-hydroxymethyl-6-methyluracil | 200 | 3-sec-butyl-5-hydroxymethyl-6-methylhydrouracil. |
| 3-cyclohexyl-5-methoxymethyl-6-methyluracil | 238 | 3-cyclohexyl-5-methoxymethyl-6-methylhydrouracil. |
| 3-isopropyl-5-methoxymethyl-6-methyluracil | 198 | 3-isopropyl-5-methoxymethyl-6-methylhydrouracil. |
| 3-(3a,4,5,6,7,7a-hexahydro-4,7-methano-5-indenyl)-5,6-trimethyleneuracil | 299 | 3-(3a,4,5,6,7,7a-hexahydro-4,7-methano-5-indenyl)-5,6-trimethylenehydrouracil. |
| 3-(bicyclo[3,2,1]oct-3-yl)-6-methyluracil | 248 | 3-(bicyclo[3,2,1]oct-3-yl)-6-methylhydrouracil. |
| 3-cyclopropyl-5,6-dimethyluracil | 180 | 3-cyclopropyl-5,6-dimethylhydrouracil. |
| 3-(decahydro-1,4,5,8-dimethanonaphthylmethyl)-6-methyluracil | 299 | 3-(decahydro-1,4,5,8-dimethanonaphthylmethyl)-6-methylhydrouracil. |

EXAMPLE 3

*Preparation of 6-acetoxy-5,5-dichloro-3-isopropyl-6-methylhydrouracil*

A mixture of 168 parts of 3-isopropyl-6-methyluracil and 1000 parts of acetic anhydride is maintained under a nitrogen blanket with stirring, as 142 parts of gaseous chlorine are gradually added. The reaction mixture is maintained at 10° C. with a cooling bath. The addition of chlorine is complete in about 1 hour and the reaction is stirred at wet ice-bath temperature for an additional one-half hour.

During the course of the reaction, the original solid dissolves completely and a new solid reprecipitates. This is filtered off, washed with cyclohexane and dried. The product is sufficiently pure for incorporation into herbicidal formulations.

The following compounds are prepared in a like fashion by substituting the listed reactants for those used in this example.

| Uracil Starting Material | Parts by weight | Halogen | Parts by weight | Anhydride | Hydrouracil Product |
| --- | --- | --- | --- | --- | --- |
| 5,6-dimethyl-3-isopropyluracil | 182 | Chlorine | 71 | Acetic anhydride | 6-acetoxy-5-chloro-5,6-dimethyl-3-isopropylhydrouracil. |
| 3-isobutyl-6-methyluracil | 182 | do | 142 | do | 6-acetoxy-3-isobutyl-5,5-dichloro-6-methylhydrouracil. |
| 5-chloro-3-isopropyl-6-methyluracil | 202.5 | Bromine | 160 | do | 6-acetoxy-5-bromo-5-chloro-3-isopropyl-6-methylhydrouracil. |
| 3-sec-butyl-6-methyluracil | 182 | Chlorine | 142 | do | 6-acetoxy-3-sec-butyl-5,5-dichloro-6-methylhydrouracil. |
| 3-sec-amyl-6-methyl-5-nitrouracil | 241 | do | 71 | do | 6-acetoxy-3-sec-amyl-5-chloro-6-methyl-5-nitrohydrouracil. |
| 3-cyclopentyl-6-methyluracil | 194 | do | 142 | do | 6-acetoxy-3-cyclopentyl-5,5-dichloro-6-methylhydrouracil. |
| 3-cyclohexyl-6-methyluracil | 108 | do | 142 | do | 6-acetoxy-3-cyclohexyl-5,5-dichloro-6-methylhydrouracil. |
| 3-isopropyl-6-methyluracil | 168 | do | 142 | Propionic anhydride | 5,5-dichloro-3-isopropyl-6-methyl-6-propionoxyhydrouracil. |
| Do | 168 | do | 142 | Chloroacetic anhydride | 6-chloroacetoxy-5,5-dichloro-6-methyl-3-isopropylhydrouracil. |
| 3-cyclooctyl-6-methyluracil | 236 | do | 142 | Acetic anhydride | 6-acetoxy-3-cyclooctyl-5,5-dichloro-6-methylhydrouracil. |
| 3-cyclohexyl-5-methoxymethyl-6-methyluracil | 252 | do | 71 | do | 6-acetoxy-5-chloro-3-cyclohexyl-5-methoxymethyl-6-methylhydrouracil. |
| 6-chloro-3-propyluracil | 188.5 | do | 142 | do | 6-acetoxy-3-isopropyl-5,5,6-trichlorohydrouracil. |
| 3-butyl-6-methoxyuracil | 198 | do | 142 | do | 6-acetoxy-3-butyl-5,5-dichloro-6-methoxyhydrouracil. |
| 3-tert-butyl-6-methyluracil | 182 | do | 142 | Butyric anhydride | 6-butyroxy-3-tert-butyl-5,5-dichloro-6-methylhydrouracil. |
| 5-fluoro-6-methyl-3-phenyluracil | 220 | Bromine | 160 | Acetic anhydride | 6-acetoxy-5-bromo-5-fluoro-6-methyl-3-phenylhydrouracil. |
| 3-cyclohexyl-5,6-dimethyluracil | 222 | Chlorine | 71 | do | 6-acetoxy-5-chloro-3-cyclohexyl-5,6-dimethylhydrouracil. |
| 3-sec-butyl-6-methyluracil | 182 | do | 142 | Hexanoic anhydride | 3-sec-butyl-5,5-dichloro-6-hexanooxy-6-methyluracil. |
| 6-methyl-3-phenyluracil | 202 | do | 142 | Acetic anhydride | 6-acetoxy-5,5-dichloro-6-methyl-3-phenylhydrouracil. |

EXAMPLE 4

*Preparation of 3-isopropyl-6-methyl-5,5,6-trichlorohydrouracil*

Into a vessel equipped with a stirrer, Dry-Ice condenser, and thermometer are placed 500 parts of acetic acid, 200 parts of water and 168 parts of 3-isopropyl-6-methyluracil. The mixture is stirred and maintained at 30–35° C. as 147 parts of chlorine are gradually added. The reaction is rapid and after the mixture has been stirred for a short time, an additional 800 parts of water are added.

The resulting solid white precipitate is filtered off. The filter cake is resuspended in 600 parts of water, filtered, and the solid allowed to air dry. The 5,5-dichloro-6-hydroxy-3-isopropyl-6-methylhydrouracil thus prepared melts at 136.5–138.5° C.

Five hundred parts of thionyl chloride are placed in a vessel equipped with a stirrer and a condenser fitted with a scrubber to wash away corrosive gases. To this are gradually added, with stirring, 255 parts of the 5,5-dichloro-6-hydroxy-3-isopropyl-6-methylhydrouracil. Stirring is continued until hydrogen chloride and sulfur dioxide evolution ceases.

A total of 800 parts of cyclohexane are added to the mixture and the resulting white solid precipitate is filtered off. The precipitate is resuspended in 400 parts of cyclohexane and refiltered. The solid is dried in a vacuum oven at room temperature. The subject product is sufficiently pure for incorporation into herbicidal formulations.

The compounds listed in the following table are prepared in a similar fashion by substituting the listed reactants for those used in this example.

| Uracil Starting Material | Parts by Weight | Hydrouracil Product |
|---|---|---|
| 3-butyl-6-methyluracil | 182 | 3-butyl-6-methyl-5,5,6-trichlorohydrouracil. |
| 6-methyl-3-sec-butyluracil | 182 | 6-methyl-3-sec-butyl-5,5,6-trichlorohydrouracil. |
| 3-cyclohexyl-6-methyluracil | 208 | 3-cyclohexyl-6-methyl-5,5,6-trichlorohydrouracil. |
| 6-methyl-3-pentyluracil | 196 | 6-methyl-3-pentyl-5,5,6-trichlorohydrouracil. |
| 3-cyclopentyl-6-methyluracil | 194 | 3-cyclopentyl-6-methyl-5,5,6-trichlorohydrouracil. |
| 3-cycloheptyl-6-methyluracil | 222 | 3-cycloheptyl-6-methyl-5,5,6-trichlorohydrouracil. |
| 3-cyclooctyl-6-methyluracil | 236 | 3-cyclooctyl-6-methyl-5,5,6-trichlorohydrouracil. |
| 6-ethyl-3-isopropyluracil | 182 | 6-ethyl-3-isopropyl-5,5,6-trichlorohydrouracil. |
| 3-cyclohexyl-6-ethyluracil | 222 | 3-cyclohexyl-6-ethyl-5,5,6-trichlorohydrouracil. |
| 2-isopropyl-6-chlorouracil | 188 | 3-isopropyl-5,5,6,6-tetrachlorohydrouracil. |
| 6-methyl-3-phenyluracil | 202 | 6-methy-3-phenyl-5,5,6-trichlorohydrouracil. |
| 6-ethyl-3-phenyluracil | 216 | 6-ethyl-3-phenyl-5,5,6-trichlorohydrouracil. |
| 6-methyl-3-p-tolyluracil | 216 | 6-methyl-3-p-tolyl-5,5,6-trichlorohydrouracil. |
| 3-(p-chlorophenyl)-6-methyluracil | 236.5 | 3-(p-chlorophenyl)-6-methyl-5,5,6-trichlorohydrouracil. |
| 6-methyl-3-p-nitrophenyluracil | 247 | 6-methyl-3-p-nitrophenyl-5,5,6-trichlorohydrouracil. |

The compounds listed in the following table can also be prepared by the foregoing methods:

6-cyclohexyloxy-3-isopropyl-5,5,6-trichlorohydrouracil
5-bromo-5-chloro-3-cyclohexyl-6-ethoxy-6-methylhydrouracil
5,6-dichloro-5-hydroxymethyl-6-methoxy-3-(4-methyl-3-nitrophenyl)hydrouracil
5,5-dichloro-3-(2,6-dinitrophenyl)-6-ethoxy-6-ethyl-hydrouracil
3-sec-butyl-5,5-dichloro-6-methoxyhydrouracil
5-bromo-6-bromomethyl-6-ethoxy-5-nitro-3-phenyl-hydrouracil
5-bromo-5-chloro-6-cyclohexyloxy-6-methyl-3-phenyl-hydrouracil
5-bromo-6-chloro-3-cyclohexyl-6-methoxy-5-nitrohydrouracil
5,5-dichloro-6-ethoxy-6-methyl-3-(m-trifluoromethylphenyl)hydrouracil
5,5-dichloro-6-ethoxy-6-methyl-3-(m-perchlorylphenyl)hydrouracil
5-chloro-3-cyclohexyl-5-(5-hydroxyamyl)-6-methoxy-6-methylhydrouracil
5-butylthio-5-chloro-6-ethoxy-3-isopropyl-6-methylhydrouracil
5-chloro-6-ethoxy-5-flouromethyl-3-isopropyl-6-methylhydrouracil
5-chloro-6-ethoxy-3-isopropyl-5-methyl-6-methylthio-hydrouracil
5-chloro-3-cyclohexyl-6-ethoxy-6-methyl-5-methylthiomethlyhydrouracil
5-amyloxymethyl-5-chloro-6-methyl-3-phenylhydrouracil
5,6-dichloro-3-isopropyl-5,6-trimethylenehydrouracil
5,6-dichloro-3-isopropyl-6-methyl-5-nitrohydrouracil
5,6-dichloro-6-ethyl-5-methoxymethyl-3-phenylhydrouracil
3-(2,5-dimethylcyclohexyl)-6-ethyl-5-methylhydrouracil
5,6-dimethyl-3-(2,4-dimethylcyclohexyl)hydrouracil
3-(2,5-dimethylcyclohexyl)-5,6-trimethylenehydrouracil
3-cyclooctyl-5,6-pentamethylenehydrouracil

EXAMPLE 5

*Preparation of 3-methylhydrouracil*

A solution of 117 parts of ethyl β-aminopropionate in 500 parts of dioxane is treated with 57 parts of methyl isocyanate. The temperature during this addition is maintained at 20–30° C. by external cooling. The solution is stirred 30 minutes longer; after which the solvent is stripped under reduced pressure. The residue is then mixed with 300 parts of 6 N hydrochloric acid and refluxed for 3 hours. Evaporation to dryness then gives 3-methylhydrouracil which may be purified by recrystallization from alcohol, M.P. 129.5–131° C.

The compounds listed in the following table are prepared in similar fashion by substituting equimolar amounts of the reactants listed for the ethyl β-aminopropionate and methyl isocyanate used in the example.

| Isocyanate | β-amino Ester | Hydrouracil Product |
|---|---|---|
| Cyclohexyl isocyanate | Ethyl β-amino-β-methylbutyrate | 3-cyclohexyl-6,6-dimethylhydrouracil. |
| Norbornylmethyl isocyanate | Ethyl β-aminobutyrate | 3-norbornylmethyl-6-methylhydrouracil. |
| sec-butyl isocyanate | Ethyl β-aminooctanoate | 3-sec-butyl-6-amylhydrouracil. |
| Phenyl isocyanate | Ethyl β-amino-α,α-β-trimethylbutyrate | 3-phenyl-5,5,6,6-tetramethylhydrouracil. |
| Naphthyl isocyanate | Ethyl β-amino-α-butylpropionate | 3-α-napthhyl-5-butylhydrouracil. |
| (2-cyanoethyl) isocyanate | Ethyl β-amino-γ-chlorobutyrate | 3-(2-cyanoethyl)-6-chloromethylhydrouracil. |
| Dibromonorbornyl isocyanate | Ethyl β-amino-α,α-dimethylbutyrate | 3-(dibromonorbornyl)-5,5,6-trimethylhydrouracil |
| Cyclooctyl isocyanate | Ethyl β-aminopropionate | 3-cyclooctylhydrouracil. |
| tert-butyl isocyanate | Ethyl β-amino-α-fluorobutyrate | 3-tert-butyl-5-fluoro-6-methylhydrouracil. |
| m-Chlorophenyl isocyanate | Ethyl β-amino-α-methylbutyrate | 3-m-chlorophenyl-5,6-dimethylhydrouracil. |
| m-Bromphenyl isocyanate | do | 3-m-bromophenyl-5,6-dimethylhydrouracil. |
| 2,4,5-trichlorophenyl isocyanate | do | 5,6-dimethyl-3-(2,4,5-trichlorophenyl)hydrouracil |
| Chloroethyl isocyanate | Ethyl β-amino-α-ethylpropionate | 3-chloroethyl-5-ethylhydrouracil. |
| α-Furfuryl isocyanate | Ethyl β-amino-γ-bromoheptanoate | 3-(α-furfuryl)-6-bromobutylhydrouracil. |
| Chlorocyclopropyl isocyanate | Ethyl β-amino-α-methylthiobutyrate | 3-chlorocyclopropyl-6-methyl-5-methylthiohydrouracil. |
| Dichlorodecahydro-1,4,5,8-dimethanonaphthyl isocyanate. | Ethyl β-amino-α-butylthiopropionate | 3-(dichlorodecahydro-1,4,5,8-dimethanonaphthyl)-5-butylthiohydrouracil. |
| Cyclobutenyl isocyanate | Ethyl β-amino-α-methylpropionate | 3-cyclobutenyl-5-methylhydrouracil. |
| Octahydro-1,4,5,8-dimethanonaphthyl isocyanate. | Ethyl β-amino-α-methylthiomethylbutyrate | 3-(octahydro-1,4,5,8-dimethanonaphthyl)-6-methyl-5-methylthiomethylhydrouracil. |
| Cyclobutenylmethyl isocyanate | Ethyl β-methylamino-α-methoxypropionate | 3-cyclobutenylmethyl-5-methoxy-1-methylhydrouracil. |
| Octahydro-1,4,5,8-dimethanonaphthylmethyl isocyanate. | Ethyl β-amino-α-hydroxypropylbutyrate | 3-(octahydro-1,4,5,8-dimethanonaphthyl)-5-methyl-5-hydroxypropylhydrouracil. |
| Dibromodecahydro-1,4,5,8-dimethanonaphthylmethyl isocyanate. | Ethyl β-amino-α-propoxyvalerate | 3-(dibromodecahydro-1,4,5,8-dimethano-naphthylmethyl)-6-ethyl-5-propoxyhydrouracil. |
| 2,3-dichlorocyclobutylmethyl isocyanate | Ethyl β-aminobutyrate | 3-(2,3-dichlorocyclobutylmethyl)-6-methylhydrouracil. |
| 2-methoxy-1-cyclobutenylmethyl isocyanate | Ethyl β-amino-α-chlorobutyrate | 3-(2-methoxy-1-cyclobutenylmethyl)-5-chloro-6-methylhydrouracil. |
| Chlorooctahydro-1,4,5,8-decahydronaphthylethyl isocyanate. | Ethyl β-amino-α-iodopropionate | 3-(chlorooctahydro-1,4,5,8-decahydronaphthylethyl)-5-iodohydrouracil. |

EXAMPLE 6

*Preparation of 3-butyl-6-methylhydrouracil*

An intimate mixture of 40 parts of crotonic acid and 58 parts of butylurea is heated at 210–220° C. for 2 hours. The liquid is then cooled and the resulting glassy solid recrystallized to give pure 3-butyl-6-methylhydrouracil.

The compounds listed in the following table are prepared similarly by substituting equimolar amounts of the reactants listed for the crotonic acid and butylurea used in the example.

| Substituted Urea | α,β-unsaturated Acid | Hydrouracil Product |
|---|---|---|
| Cyclopentenylurea | α,β-Dimethylcrotonic acid | 3-cyclopentenyl-5,6,6-trimethylhydrouracil. |
| Decylurea | Hept-2-enoic acid | 3-decyl-6-butylhydrouracil. |
| Tetrahydrofurfurylurea | α-Ethylacrylic acid | 3-tetrahydrofurfuryl-5-ethhlhydrouracil. |
| 2,6-diisopropylbenzylurea | α-Methylcrotonic acid | 3-(2,6-diisopropylbenzyl)-5,6-dimethylhydrouracil. |
| Oct-3-ynylurea | Crotonic acid | 3-(oct-3-ynyl)-6-methylhydrouracil. |
| Cyclohexylurea | Cyclohexylic acid | 3-cyclohexyl-5-methylhydrouracil. |
| Cyclobutenylurea | α,β-Dimethylpenten-2-oic acid | 3-cyclobutenyl-6-ethyl-5,6-dimethylhydrouracil. |
| Propynylurea | α-Methylcrotonic acid | 5,6-dimethyl-3-propynylhydrouracil. |
| m-Pyridylurea | Methacrylic acid | 5-methyl-3-m-pyridylhydrouracil. |
| Methylurea | α-Methylcrotonic acid | 3,5,6-trimethylhydrouracil. |
| α-Naphthylmethylurea | Methacrylic acid | 5-methyl-3-α-naphthylmethylhydrouracil. |
| 5-nitrofurfurylurea | do | 5-methyl-3-(5-nitrofurfuryl)hydrouracil. |
| (2-buten-2-yl)urea | do | 3-(2-buten-2-yl)-5-methylhydrouracil. |
| 5-cyanopentylurea | α-Methylcrotonic acid | 3-(5-cyanopentyl)-5-6-dimethylhydrouracil. |
| 1,1,5-trimethyl-5-hydroxypentylurea | do | 5,6-dimethyl-3-(1,1,5-trimethyl-5-hydroxypentyl) hydrouracil. |
| 5-methoxycarbonylpentylurea | do | 5,6-dimethyl-3-(5-methoxycarbonylpentyl)hydrouracil. |
| Ethoxycarbonylmethylurea | do | 5,6-dimethyl-3-(ethoxycarbonylmethyl)hydrouracil. |
| 2-hydroxyethylurea | do | 5,6-dimethyl-3-(2-hydroxyethyl)hydrouracil. |
| 1,2-dimethylcyclopentylurea | do | 5,6-dimethyl-3-(1,2-dimethylcyclopentyl)hydrouracil. |
| 6-methoxy-3,3-dimethylindanylurea | Methacrylic acid | 5-methyl-3-(6-methoxy-3,3-dimethylindanyl)hydrouracil. |
| 2-bromoethylurea | α-Ethylacrylic acid | 3-(2-bromoethyl)-5-ethylhydrouracil. |
| Octen-7-ylurea | do | 5-ethyl-3-(octen-7-yl)hydrouracil. |
| m-Trifluoromethylphenylurea | do | 5-ethyl-3-(m-trifluoromethylphenyl)hydrouracil. |
| x-Chloronorbornylurea | Arcylic acid | 3-(x-chloronorbornyl)hydrouracil. |
| o-Fluorophenylurea | Methacrylic acid | 3-(o-fluorophenyl)-5-methylhydrouracil. |
| 2-methoxyethylurea | do | 3-(2-methoxyethyl)-5-methylhydrouracil. |
| Carvacrylurea | do | 3-(carvacryl)-5-methylhydrouracil. |
| 4-methoxycyclohexen-1-yl-methylurea | do | 5-methyl-3-(4-methoxycyclohexen-1-ylmethyl)hydrouracil. |
| 4-chlorobutylurea | do | 3-(4-chlorobutyl)-5-methylhydrouracil. |
| o-Biphenylylurea | do | 3-(o-biphenylyl)-5-methylhydrouracil. |
| 3-methoxypropylurea | do | 3-(3-methoxypropyl)-5-methylhydrouraicl. |
| 2,3-dibromobutylurea | do | 3-(2,3-dibromobutyl)-5-methylhydrouracil. |
| 3-amyloxypropylurea | do | 3-(3-amyloxypropyl)-5-methylhydrouracil. |
| Decahydro-1,4,5,8-dimethynonaphthylurea | Acrylic acid | 3-(decahydro-1,4,5,8-dimethynonaphthyl)hydrouracil. |

EXAMPLE 8

*Preparation of 1,3-diisopropyl-5,6-trimethylenehydrouracil*

A suspension of the sodium derivative of 3-isopropyl-5,6-trimethylenehydrouracil in dioxane is prepared, under anhydrous conditions and in an atmosphere of nitrogen, by the gradual addition of 48 parts by weight of sodium hydride (55% active in mineral oil) to a stirred solution of 196 parts by weight of 3-isopropyl-5,6-trimethylenehydrouracil in 1000 parts by weight of dioxane. Formation of the sodium derivative is accompanied by the evolution of hydrogen.

When hydrogen evolution ceases, the sodium salt suspension is heated to reflux and stirred as 123 parts by weight of siopropyl bromide are gradually added. Refluxing is continued until sodium bromide formation ceases.

After cooling, the mixture is cautiously diluted with water to precipitate the product, which is filtered, dried, washed with cold heptane to remove mineral oil, and dried again. The resulting essentially pure 1,3-diisopropyl-5,6-trimethylenehydrouracil can be used as such or recrystallized from a suitable solvent if higher purity is desired.

Other 1-alkyl, alkenyl, etc., hydrouracils listed below can be prepared in a similar fashion by substituting equivalent amounts of the appropriate alkyl halide and hydrouracil for the isopropyl bromide and 3-isopropyl-5,6-trimethylenehydrouracil.

1-allyl-3-sec-butyl-6-methyl-5-nitrohydrouracil
1-ethyl-3-sec-butyl-5,6-dimethylhydrouracil
1-(4-chlorobutyl)-5,6-diethyl-3-phenylhydrouracil
1-2-hydroxyethyl)-3-cyclohexylmethyl-5-methylhydrouracil
1-(3-ethoxypropyl)-3-ethyl-5,6-dimethylhydrouracil
1-(2-cyanoethyl)-3-tert-butyl-6-methylhydrouracil
1-3-methoxycarbonylpropyl)-3-n-pentylhydrouracil
1-(2-carboxyethyl)-3-sec-butyl-5,6-dimethylhydrouracil

EXAMPLE 9

*Preparation of 5-bromo-3-cyclohexylhydrouracil*

A total of 5.14 ml. of bromine contained in 20 ml. of glacial acetic acid is added dropwise to a well stirred and refluxing solution of 19.6 g. of 3-cyclohexylhydrouracil contained in 60 ml. of glacial acetic acid. Approximately 1½ hours are required for the addition. The solution is cooled whereupon solid separates. It is collected and recrystallized from acetonitrile to give pure 5-bromo-3-cyclohexylhydrouracil melting at 225–227° C.

The products in the following table are prepared in a similar fashion by substituting equivalent amounts of the listed reactants for those specified above.

| Dihydrouracil Reactant | Halogen | Hydrouracil Product |
|---|---|---|
| 3-sec-butyl-6-methylhydrouracil | Bromine | 5-bromo-3-sec-butyl-6-methylhydrouracil. |
| 3-tert-butyl-6-methylhydrouracil | do | 5-bromo-3-tert-butyl-6-methylhydrouracil. |
| 3-(1-ethylpropyl)-6-methylhyrouracil | do | 5-bromo-3-(1-ethylpropyl)-6-methylhydrouracil. |
| 3-cyclohexylmethyl-6-methylhydrouracil | do | 5-bromo-3-cyclohexlmethyl-6-methylhydrouracil. |
| 3-cyclohexylmethyl-6-methylhydrouracil | Chlorine | 5-chloro-3-cyclohexlmethyl-6-methylhydrouracil. |
| 3-phenyl-6-methylhydrouracil | Bromine | 5-bromo-6-methyl-3-phenylhydrouracil. |
| 3-sec-butyl-6-methylhydrouracil | Chlorine | 5-chloro-6-methyl-3-sec-butylhydrouracil. |
| 3-isopropyl-6-methylhydrouracil | Bromine | 5-bromo-3-isopropyl-6-methylhydrouracil. |
| 3-norbornylmethyl-6-methylhydrouracil | do | 5-bromo-6-methyl-3-norbornylhydrouracil. |
| 3-sec-butyl-5-methylhydrouracil | Cholrine | 5-chloro-3-sec-butyl-5-methylhydrouracil. |
| 3-cyclohexyl-5-methylhydrouracil | Bromine | 5-bromo-3-cyclohexyl-5-methylhydrouracil. |
| 3-cyclohexyl-5-methoxyhydrouracil | Chlorine | 5-chloro-3-cyclohexyl-5-methoxyhydrouracil. |

EXAMPLE 10

*Preparation of 6-methoxy-6-methyl-3-isopropyl-1,5,5-trichlorohydrouracil*

A total of 26.9 parts by weight of 5,5-dichloro-6-methoxy-6-methyl-3-isopropylhydrouracil is combined with 200 parts by weight of acetic acid and 40 parts by weight of water. This mixture is cooled to 0° C. and stirred while a cold aqueous solution composed of 9.6 parts by weight of sodium hydroxide, 100 parts by weight of water, and 8.2 parts by weight of chlorine gas is gradually added to it, maintaining the reaction temperature below 5° C. After stirring for an hour longer, the solid which forms is filtered and washed with water until free of acid, then air dried to yield good technical quality 6-methoxy-6-methyl-3-isopropyl-1,5,5 - trichlorohydrouracil.

Other 1-halogen hydrouracils which follow can be prepared similarly by reacting an equivalent amount of the appropriately substituted hydrouracil with the corresponding halogen.

3-cyclohexylmethyl-6-methoxy-6-methyl-1,5,5-trichlorohydrouracil
1-chloro-3-cyclohexyl-5,6-trimethylenehydrouracil
6-methoxy-6-methyl-3-isopropyl-1,5,5-trichlorohydrouracil
1-bromo-3-sec-butyl-6-methoxy-6-methyl-5,5-dichlorohydrouracil
6-ethoxy-6-methyl-3-norbornylmethyl-1,5,5-trichlorohydrouracil
3-(1-ethylpropyl)-6-methoxy-6-methyl-1,5,5-trichlorohydrouracil
5-bromo-3-sec-butyl-1,5-dichloro-6-methoxy-6-methylhydrouracil
6-methoxy-6-methyl-3-phenyl-1,5,5-trichlorohydrouracil

EXAMPLE 11

|   | Percent |
|---|---|
| 5,5 - dichloro - 3 - isopropyl - 6 - methoxy - 6 - methylhydrouracil | 80.0 |
| Alkyl naphthalene sulfonate, Na salt | 2.0 |
| Partially desulfonated calcium lignin sulfonate | 0.5 |
| Attapulgite clay | 14.5 |
| Precipitated tricalcium phosphate | 3.0 |

These components are blended, micropulverized until the particles are under 50 microns in diameter, then reblended.

The same conditioning agents can be used to formulate wettable powders with the following compounds:

3-cyclohexyl-5,5-dichloro-6-methoxy-6-methylhydrouracil
3-sec-butyl-5,5-dichloro-6-methoxy-6-methylhydrouracil
5,5-dichloro-6-methoxy-6-methyl-3-phenylhydrouracil
5,5-dichloro-6-hydroxy-6-methyl-3-phenylhydrouracil
3-tert-butyl-5,5-dichloro-6-methoxy-6-methylhydrouracil
3-cyclopentyl-5,5-dichloro-6-methoxy-6-methylhydrouracil
5-chloro-3-cyclohexyl-6-epoxy-6-methyl-5-nitrohydrouracil
3-tert-butyl-5,5-dibromo-6-hydroxy-6-methylhydrouracil
5,5-dichloro-6-ethoxy-6-methyl-3-phenylhydrouracil
6-2-chloroethoxy)-5,5-dichloro-6-methyl-3-phenylhydrouracil
3-cyclohexyl-5,6-dimethylhydrouracil
6-acetoxy-3-cyclopentyl-5,5-dichloro-6-methylhydrouracil
6-methyl-3-phenyl-5,5,6-trichlorohydrouracil
3-butyl-5-chloro-6-methylhydrouracil
3-(4'-diphenylyl)-5,5-dichloro-6-methyl-6-propoxyhydrouracil
3-p-chlorophenyl-5,5-dichloro-6-ethoxy-6-methylhydrouracil
5,5-dichloro-6-methoxy-6-methyl-3-m-tolylhydrouracil
5,5-dichloro-3-ethyl-6-methoxyhydrouracil
5,5-dichloro-3,6-dimethyl-6-methoxyhydrouracil
3-norbornylmethyl-1,5,5,6-tetramethylhydrouracil
3-cyclopropyl-5,5-dichloro-1-isoamyl-6-methoxy-6-methylhydrouracil
5,5-dichloro-3,6-dimethyl-6-ethoxyhydrouracil
5,5-dichloro-3,6-dimethyl-6-isopropoxyhydrouracil
6-bromo-3-cyclohexyl-5,5-dichloro-6-methylhydrouracil
6-bromo-5,5-dichloro-6-methyl-3-phenylhydrouracil
6-methyl-3-phenyl-5,5,6-tribromohydrouracil
3-(4'-biphenylyl)-6-methyl-5,5,6-trichlorohydrouracil
3-cyclohexylhydrouracil
5-methyl-3-phenylhydrouracil
3-p-chlorophenyl-5-methylhydrouracil
3-(3,4-dichlorophenyl)-5-methylhydrouracil
6-methyl-3-phenylhydrouracil
5-methyl-3-(1-naphthyl)hydrouracil
6-methyl-3-(1-naphthyl)hydrouracil
3-(4'-biphenylyl)-5-methylhydrouracil
3-(4'-biphenylyl)-6-methylhydrouracil
6-methyl-3-norbornylhydrouracil
3-bornyl-6-methylhydrouracil
5-bromo-3-(p-chlorophenyl)-1-methylhydrouracil
5-bromo-6-cyclohexyl-3-methylhydrouracil
5-bromo-6-methyl-3-phenylhydrouracil
5-chloro-3-cyclohexyl-6-methylhydrouracil
5-chloro-6-methyl-3-phenylhydrouracil
5-bromo-6-methyl-3-(2-naphthyl)hydrouracil
5-bromo-3-(4'-biphenylyl)-6-methylhydrouracil
5-bromo-6-methyl-3-norbornylhydrouracil
5-bromo-6-hydroxy-3-isopropyl-6-methylhydrouracil
5-bromo-3-sec-butyl-6-hydroxy-6-methylhydrouracil
5-bromo-6-hydroxy-6-methyl-3-phenylhydrouracil
5-bromo-3-cyclohexyl-6-hydroxy-6-methylhydrouracil
5-chloro-6-hydroxy-3-isopropyl-6-methylhydrouracil
5-chloro-3-cyclohexyl-6-hydroxy-6-methylhydrouracil
5-chloro-6-hydroxy-6-methyl-3-phenylhydrouracil
6-acetoxy-3-(2,3-dibromopropyl)-5,5-dichloro-6-ethylhydrouracil These formulations, applied at 20 pounds of active ingredient per acre in 100 gallons of water per acre with conventional mechanical sprayers, give excellent control of grasses and broad-leaved weeds around lumber yards and areas where vegetation creates a fire hazard. Such weeds as quackgrass, crabgrass, foxtail, Johnson grass, lamb's-quarters, pigweed, velvet leaf, spurge and purslane are controlled.

When 3 - cyclohexyl-5,5-dichloro-6-methoxy-6-methylhydrouracil is applied as a pre-emergence wettable powder formulation at 1 to 2 pounds of active ingredient per acre, giant and yellow foxtail, crabgrass and chickweed are removed selectively without injury to established Bermuda grass.

EXAMPLE 12

|   | Percent |
|---|---|
| 5,5-dibromo-6-hydroxy-3-isopropyl-6-methylhydrouracil | 50.00 |
| Dioctyl sodium sulfosuccinate concreted with 15% sodium benzoate | 1.00 |
| Low viscosity methyl cellulose | 0.25 |
| Finely-ground ignited montmorillonoid clay, (Pikes Peak clay) | 48.75 |

These ingredients are blended, micropulverized until the particles are under 50 microns in diameter, then reblended.

This formulation is applied at 40 pounds per acre in 80 gallons of water per acre to a stand of plants constituting a fire hazard around oil storage tanks. The treatment gives excellent control of this plant growth. Such species as wild barley, ryegrass, yellow foxtail, vervain, cinquefoil, wild mustard, quackgrass, and seedling Johnson grass are controlled for an extended period.

This formulation, applied at 1 to 2 pounds of active ingredient per acre, as a pre-emergence or directed post-emergence spray, also gives excellent selective control of crabgrass, annual bluegrass and chickweed without injury to established Weigela, an ornamental plant.

Other compounds which can be formulated in the same manner are:

5,5-dibromo-6-hydroxy-6-methyl-3-phenylhydrouracil
3-sec-butyl-5,5-dibromo-6-hydroxy-6-methylhydrouracil
6-acetoxy-5,5-dichloro-3-isopropyl-6-methylhydrouracil
3-isopropyl-6-methyl-5,5,6-trichlorohydrouracil
3-sec-butyl-6-(2-chloroethoxy)-5,5-dichloro-6-methylhydrouracil
5,5-dichloro-6-ethoxy-6-methyl-3-(1-naphthyl)hydrouracil
3-butyl-5,6-dimethylhydrouracil
3-tert-butyl-5,6-trimethylenehydrouracil
3-cyclohexyl-5-methoxymethyl-6-methylhydrouracil
6-acetoxy-3-cyclohexyl-5,5-dichloro-6-methylhydrouracil
5-methyl-3-norbornylhydrouracil
5-bromo-3-isopropyl-6-methylhydrouracil
5-bromo-3-tert-butyl-6-methylhydrouracil
3-ethyl-6-methyl-5,5,6-trichlorohydrouracil
3-(4'-biphenylyl)5,5-dichloro-6-methoxy-6-methylhydrouracil
3-boronyl-6-methylhydrouracil
5-bromo-3-(hexahydro-4,7-methanoindenyl)hydrouracil
5-bromo-3-(hexahydro-4,7-methanoindenyl)-6-methylhydrouracil
5,5-dibromo-3-(3,4-dibromophenyl)-1,6-dimethyl-6-hydroxyhydrouracil
5-bromo-6-chloro-3-(difluoromethylphenyl)-5-fluoro-6-hydroxyhydrouracil
3-cycloheptyl-5,5-dibromo-6-hydroxy-6-methylhydrouracil
3-cyclooctyl-5,5-dibromo-6-hydroxy-6-methylhydrouracil
5,5-dibromo-6-hydroxy-6-methyl-3-p-tolyhydrouracil
5,5-dibromo-6-ethyl-6-hydroxy-3-isopropylhydrouracil
3-sec-butyl-5,5-dibromo-6-ethyl-6-hydroxyhydrouracil
5,5-dichloro-6-hydroxy-3-isopropyl-6-methylhydrouracil
5,5-dichloro-6-hydroxy-6-methyl-3-phenylhydrouracil
5-bromo-6-hydroxy-3-isopropyl-5-methoxymethyl-6-methylhydrouracil
5-bromo-3-cyclohexyl-6-hydroxy-5-methoxymethyl-6-methylhydrouracil
5-bromo-5-methoxymethyl-6-methyl-3-phenylhydrouracil
5-bromo-6-hydroxy-3-isopropyl-6-methyl-5-nitrohydrouracil
5-bromo-3-cyclohexyl-6-hydroxy-5-methoxy-6-methylhydrouracil
5-bromo-3-cyclohexyl-1,6-dimethyl-5-fluoro-6-hydroxyhydrouracil
5-bromo-3-cyclohexyl-6-methyl-5-hydroxymethyl-6-methylhydrouracil
5-bromo-5-chloro-6-ethoxy-3-ethyl-6-methylhydrouracil
5,5-dibromo-6-hydroxy-3-methyl-6-propylhydrouracil
5,5-dibromo-1,6-dimethyl-6-hydroxy-3-isopropylhydrouracil
3-butyl-5,5-dibromo-6-hydroxy-6-methylhydrouracil
5,5-dibromo-6-ethyl-6-hydroxy-3-isopropylhydrouracil
5,5-dibromo-6-hydroxy-6-methyl-3-pentylhydrouracil
5,5-dibromo-6-hydroxy-6-methyl-3-(2-methylbutyl)hydrouracil
5,5-dibromo-6-hydroxy-6-methyl-3-(2-methylpentyl)hydrouracil
3-cyclopentyl-5,5-dibromo-6-hydroxy-6-methylhydrouracil
3-cyclohexyl-5,5-dibromo-6-hydroxy-6-methylhydrouracil
3-cyclobutyl-5,5-dibromo-6-hydroxy-6-methylhydrouracil
3-cyclohexyl-5,5-dibromo-1,6-dimethyl-6-hydroxyhydrouracil

EXAMPLE 13

| | Percent |
|---|---|
| 5,6-dimethyl-3-isopropylhydrouracil | 25 |
| Anhydrous sodium sulfate | 10 |
| Alkyl naphthalene sulfonate, Na salt | 1 |
| Calcium, magnesium sub-bentonite | 64 |

These ingredients are blended and micropulverized, then mixed with 15–20% water, extruded through ⅛ inch dies, cut into ⅛ inch lengths and dried.

This composition is applied by hand around posts supporting highway signs or guardrails, using 1 teaspoonful of material per post. The material gives control of all vegetation around the post, eliminating hand trimming of this area for an extended period.

Other hydrouracils which can be similarly formulated are:

3-sec-butyl-5,6-trimethylenehydrouracil
3-cyclohexyl-5-methylhydrouracil
6-acetoxy-5,5-dichloro-6-methyl-3-phenylhydrouracil
3-tert-butyl-6-methyl-5,5,6-trichlorohydrouracil
3-cyclohexyl-5-methylhydrouracil
5-methyl-3-isopropylhydrouracil
5-bromo-6-methyl-3-phenylhydrouracil
5-bromo-3-cyclohexyl-6-methylhydrouracil
3-sec-butyl-5-chloro-6-methylhydrouracil
6-methoxy-6-methyl-3-phenyl-1,5,5-trichlorohydrouracil
6-acetoxy-3-tert-butyl-5,5-dichloro-6-methylhydrouracil
5-bromo-3-(hexahydro-4,7-methanoindenyl)-6-methylhydrouracil
6-(2-chloroethoxy)-3-(4-chlorooctyl)-5,5-dichloro-6-methylhydrouracil
5,5-dichloro-3-isopropyl-6-methyl-6-(2,2,3,3-tetrafluoropropoxy)hydrouracil
3-cyclohexyl-5,5-dichloro-6-methyl-6-(2,2,3,3-tetrafluoropropoxy)hydrouracil
6-bromo-5,5-dichloro-3-isopropyl-6-methylhydrouracil
3-butyl-5-methylhydrouracil
3-cyclopentylhydrouracil
3-cyclopentenylhydrouracil
3-cyclooctylhydrouracil
3-butyl-5-chlorohydrouracil
5-butyl-3-(1-decahydronaphthyl)-6-hexylhydrouracil
3-(4-ethoxycyclohexyl)-5,6-tetramethylenehydrouracil
5,6-dimethyl-3-(3,4,5-trimethoxycyclohexyl)hydrouracil
1-methyl-3-phenylhydrouracil
3-(p-ethylbenzyl)-5,5,6-trimethylhydrouracil

EXAMPLE 14

| | Percent |
|---|---|
| 5-bromo-3-isopropyl-6-methylhydrouracil | 25 |
| Low viscosity methyl cellulose | 3 |
| Kaolin clay | 72 |

These components are blended, micropulverized, mixed with 15–20% water and moist granulated in a granulator, dried, and screened to give 15 to 60 mesh granules.

This formulation, at 25 pounds per acre of active ingredient, gives good control of a wide variety of vegetation in forest fire lanes for an extended period. A wide variety of annual and perennial weeds, such as evening primrose, pokeweed, cockebur, goose grass, and purple top are controlled.

The following compounds can be similarly formulated:

5-bromo-6-methyl-3-phenylhydrouracil
5-chloro-3-cyclohexyl-6-methylhydrouracil
5-chloro-6-methyl-3-phenylhydrouracil
5-bromo-6-methyl-3-norbornylhydrouracil
6-acetoxy-5,5-dichloro-6-methyl-3-(1-naphthyl)hydrouracil
3-cyclohexyl-6-methyl-5,5,6-trichlorohydrouracil
5,5-dichloro-6-methoxy-6-methyl-3-phenylhydrouracil
5,5-dichloro-3-ethyl-6-methoxy-6-methylhydrouracil
3-butyl-5,5-dichloro-6-methoxy-6-methylhydrouracil
3-cyclohexyl-5,5-dichloro-6-(2-methoxyethoxy)-6-methylhydrouracil
5,5-dichloro-6-(2-methoxyethoxy)-6-methyl-3-isopropylhydrouracil
5,5-dichloro-6-(2-methoxyethoxy)-6-methyl-3-phenylhydrouracil
6-acetoxy-5,5-dichloro-3-ethyl-6-methylhydrouracil
3-ethyl-6-methyl-5,5,6-trichlorohydrouracil
3-sec-butyl-5-methylhydrouracil
3-cyclohexyl-6-methylhydrouracil
5-chloro-3-cyclopentyl-5,6-dimethoxy-6-methylhydrouracil 5-bromo-5-chloro-6-hydroxy-3-isopropyl-6-methyl-
  hydrouracil
5-bromo-5,6-dichloro-6-hydroxy-3-isopropylhydrouracil
5-bromo-6-chloro-6-hydroxy-5-hydroxymethyl-
  3-isopropylhydrouracil
1-chloro-3-cyclohexyl-5,6-trimethylenehydrouracil

EXAMPLE 15

| | Percent |
|---|---|
| 3-butyl-5,5-dichloro-6-methyl-6-propoxyhydrouracil | 20 |
| Xylene | 80 |

This composition is made by mixing the mutually soluble components together.

This composition, applied at 20 pounds of active ingredient per acre in 80 gallons of diesel oil per acre gives excellent control of vegetation along railroad rights of way. Quackgrass, crabgrass, annual bindweed, water grass, blackeyed Susan, carpetweed, and chickweed are controlled.

Other hydrouracils which can replace the active in this formulation are:

6-butoxy-3-sec-butyl-5,5-dichloro-6-methylhydrouracil
5,6-dibromo-1,6-dimethyl-3-cyclohexyl-6-hydroxy-
  hydrouracil
6-acetoxy-3-cyclohexyl-5,5-dichloro-1,6-dimethyl-
  hydrouracil
1-amyl-3-cyclohexyl-5-methylhydrouracil
3-sec-butyl-5,5,6,6-tetramethylhydrouracil
3-sec-butyl-5,6-dibutylhydrouracil
6-acetoxy-3-cyclopentyl-5,5-dichloro-1,6-dimethyl-
  hydrouracil
6-acetoxy-3-tert-butyl-5-chloro-1,5,6-trimethyl-
  hydrouracil
3-tert-butyl-1,6-dimethyl-5,5,6-trichlorohydrouracil
1,6-dimethyl-3-isopropyl-5,5,6-trichlorohydrouracil
1,6-dimethyl-3-phenyl-5,5,6-trichlorohydrouracil
3-sec-butyl-6-ethoxy-6-methyl-1,5,5-trichlorohydrouracil
3-butyl-5,5-dichloro-1-ethyl-6-methoxy-6-methyl-
  hydrouracil
3-cyclopentyl-5,5-dichloro-1,6-dimethyl-6-methoxy-
  hydrouracil
3-isopropyl-1,5,6-trimethylhydrouracil
5,5-dibromo-1,6-diethyl-6-hydroxy-3-isopropyl-
  hydrouracil
6-(2-chloroethoxy)-5,5-dichloro-3-isopropyl-6-methyl-
  hydrouracil
3-sec-butyl-5,5-dichloro-6-(chloromethyl)-6-methyl-
  hydrouracil
3-cyclohexyl-1,6-dimethylhydrouracil
3-sec-butyl-5,5-dibromo-6-methoxy-6-methylhydrouracil
3-ethyl-6-methoxy-6-methyl-1,5,5-trichlorohydrouracil
6-ethyl-3-isopropyl-6-methoxy-1,5,5-trichlorohydrouracil
1-bromo-3-butyl-5,5-dichloro-6-methoxy-6-methyl-
  hydrouracil
3-sec-butyl-6-methoxy-6-methyl-1,5,5-trichloro
  hydrouracil
3-sec-butyl-1-chloro-5,6-trimethylenehydrouracil
3-cyclohexyl-5-chloro-6-methoxy-5-methoxymethyl-
  6-methylhydrouracil

EXAMPLE 16

| | Percent |
|---|---|
| 3-cyclohexyl-5,5-dichloro-1,6-dimethyl-6-methoxy-hydrouracil | 25 |
| Alkylated naphthalene | 40 |
| Isophorone | 30 |
| Mixed polyoxyethylene ethers and oil soluble sulfonates | 5 |

An emulsifiable oil formulation is prepared by mixing these mutually soluble components together.

The composition is extended with 80 gallons of a herbicidal oil, such as Lion Herbicidal Oil No. 6, to form a sprayable oil formulation containing 2%, by weight, of active ingredient. When applied from a pressure sprayer to weeds infesting a one acre area railroad right of way, good initial and residual control is obtained of mixed vegetation including such weeds as ragweed, pigweed, daisy, lamb's quarters, crabgrass, foxtail, quackgrass, cheat, witch grass, Jimson weed, and button weed.

Other compounds which can replace the active in this formulation include:

6-butoxy-5,5-dichloro-6-methyl-3-phenylhydrouracil
3-cyclohexyl-1,6-dimethyl-5,5,6-trichlorohydrouracil
3-isopropyl-5,6-trimethylenehydrouracil
3-tert-butyl-5,5-dichloro-1,6-dimethyl-6-ethoxy-
  hydrouracil
3-sec-butyl-5,5-dichloro-1,6-dimethyl-6-ethoxy-
  hydrouracil
5,5-dichloro-6-ethoxy-1-ethyl-6-methyl-3-phenyl-
  hydrouracil
6-(2-chloroethoxy)-5,5-dichloro-1-ethyl-6-methyl-
  3-phenylhydrouracil
3-sec-butyl-1-methyl-5,6-trimethylenehydrouracil
3-cyclohexyl-1,6-dimethyl-5-methoxymethylhydrouracil
3-tert-butyl-1,6-dimethyl-5-methoxymethylhydrouracil
3-sec-butyl-5,5-dibromo-1,6-dimethyl-6-
  hydroxyhydrouracil
3-sec-butyl-1,6-dimethyl-5-ethoxymethylhydrouracil
5-chloro-3-cyclohexyl-1,6-dimethylhydrouracil
5,5-dichloro-1,6-dimethyl-3-isopropyl-6-
  methoxyhydrouracil
3-butyl-5,5-dichloro-1-ethyl-6-methoxy-6-
  methylhydrouracil
3-cyclohexyl-5,5-dichloro-1,6-dimethyl-6-
  methoxyhydrouracil
5,5-dichloro-1,6-dimethyl-6-methoxy-3-phenylhydrouracil
3-isopropyl-1,5,6-trimethylhydrouracil
6-acetoxy-5,5-dichloro-3-(3-methoxypropyl)-6-
  methylhydrouracil
6-acetoxy-3-cyclohexyl-5,5-dichloro-1,6-
  dimethylhydrouracil
3-cyclohexyl-1,6-dimethyl-5,5,6-trichlorohydrouracil
1,5-dimethyl-3-isopropylhydrouracil
3-cyclohexyl-1,5-dimethylhydrouracil
3-butyl-6-methylhydrouracil
3-sec-butyl-6-methylhydrouracil
1,6-dimethyl-3-norbornylhydrouracil
5-bromo-3-isopropyl-6-methylhydrouracil
5-bromo-3-butylhydrouracil
5-bromo-3-sec-butyl-6-methylhydrouracil
5-bromo-3-cyclohexyl-1,6-dimethylhydrouracil
5-chloro-3-isopropyl-6-methylhydrouracil
3-sec-butyl-5-chloro-6-methylhydrouracil
1,6-dimethyl-3-norbornylhydrouracil
6-butoxy-3-(3,4-dibromophenyl)-5,5-dichloro-6-
  methylhydrouracil
5,5-dichloro-3-ethoxy-6-methoxy-6-methylhydrouracil
5-chloro-5-ethoxymethyl-6-hydroxy-6-methyl-3-
  phenylhydrouracil
5,5-dichloro-6-hydroxy-6-methyl-3-(2-naphthyl)
  hydrouracil
3-(p-bromophenyl)-5,5-dichloro-6-hydroxy-3-
  isopropylhydrouracil

EXAMPLE 17

| | Percent |
|---|---|
| 3-isopropyl-1,5,5-trichloro-6-methoxy-6-methylhydrouracil | 30 |
| Trimethyl nonyl ether of polyethylene glycol | 30 |
| Polyoxyethylene ethers plus oil soluble sulfonates | 5 |
| Isophorone | 35 |

The mutually soluble components are mixed.
Diluted with water to a concentration of 2% by weight, of active ingredient, the resulting emulsion is applied at 100 gallons per acre to a stand of weeds around warehouses and in equipment storage yards. Such species as witch grass, crabgrass, nimblewill, annual dropseed, velvet leaf, Jimson weed, and goldenrod are eliminated.

Other compounds which can replace the active component in this formulation are:

3-sec-butyl-6-methoxy-6-methyl-1,5,5-trichlorohydrouracil
1-chloro-5,6-dimethyl-3-isopropylhydrouracil
6-acetoxy-3-sec-butyl-5-chloro-1,6-dimethyl-5-nitrohydrouracil
6-acetoxy-5,5-dichloro-1,6-dimethyl-3-isopropylhydrouracil
6-acetoxy-5,5-dichloro-1,6-dimethyl-3-phenylhydrouracil
3-sec-butyl-1,6-dimethyl-5,5,6-trichlorohydrouracil
3-cyclopentyl-1,6-dimethyl-5,5,6-trichlorohydrouracil
5-bromo-3-cyclohexyl-1,6-dimethylhydrouracil
5-bromo-3-sec-butyl-1,6-dimethylhydrouracil
5-bromo-3-tetrt-butyl-1,6-dimethylhydrouracil
5-chloro-3-cyclohexyl-1,6-dimethylhydrouracil
3-sec-butyl-5-chloro-1,6-dimethyl-5-fluorohydrouracil
3-tert-butyl-5-chloro-6-ethoxy-1,5,6-trimethylhydrouracil
3-isopropyl-6-methyl-5,5,6-tribromohydrouracil
5-chloro-3-cyclooctyl-1,6-dimethylhydrouracil
3-isopropyl-6-methoxy-6-methyl-1,5,5-trichlorohydrouracil
3-cyclohexyl-6-methoxy-6-methyl-1,5,5-trichlorohydrouracil
1-bromo-5,5-dichloro-3-isopropyl-6-methoxy-6-methylhydrouracil
1-chloro-5,6-dimethyl-3-isopropylhydrouracil
1-chloro-3-cyclohexyl-5,6-dimethylhydrouracil
3-cyclohexyl-6-ethoxy-6-methyl-1,5,5-trichlorohydrouracil

EXAMPLE 18

| | Percent |
|---|---|
| 3-cyclohexyl-5,5-dichloro-6-methoxy-6-methylhydrouracil | 20 |
| Sodium dodecyl benzene sulfonate | 35 |
| Synthetic fine calcium silicate | 45 |

These components are blended and micropulverized until the hydrouracil particles are under 50 microns in diameter. This composition is applied as a directed post-emergence spray at the rate of 1.5 pounds of active ingredient and 2.6 pounds of surfactant per acre in 35 gallons of water to a vigorously growing population of annual weeds growing in sugarcane.

Excellent control of velvet leaf, lamb's-quarters, water grass, crabgrass, foxtail, and annual morning-glory is obtained.

EXAMPLE 19

| | Percent |
|---|---|
| 5,5-dichloro-3-isopropyl-6-methoxy-6-methylhydrouracil | 80.0 |
| Alkyl naphthalene sulfonate, Na salt | 2.0 |
| Partially desulfonated calcium lignin sulfonate | .5 |
| Attapulgite clay | 14.5 |
| Precipitated tricalcium phosphate | 3.0 |

These ingredients are blended and micropulverized until the hydrouracil particles are under 50 microns in diameter.

Fifteen pounds of this formulation is mixed with 6 pounds of trimethylnonyl polyethylene glycol ether in 60 gallons of water.

This mixture is applied to a fence-row infested with crabgrass, foxtail, barnyard grass, pigweed, lamb's-quarters and wild mustard. The treatment gives quick contact kill of the vegetation with excellent residual control.

EXAMPLE 20

5-chloro - 6-ethoxy-3-isopropyl-6-methyl-5 - nitrouracil may be substituted for the 5,5-dichloro-3-isopropyl-6-methoxy-6-methylhydrouracil in Example 19. The resulting wettable powder may be made up to spray concentration with water. When sprayed over a newly planted corn field at 2 pounds active per acre, excellent control of weeds such as mustard, pigweed, chickweed, and crab grass is obtained without injury to the corn.

EXAMPLE 21

5,5 - dichloro-6-ethoxy-3-isopropyl - 6-methylhydrouracil may be substituted for the 5,5-dichloro-3-isopropyl-6-methoxy-6-methylhydrouracil in Example 20 above. This formulation is applied at rates of 1½ pounds of active per acre to a newly seeded field of flax. Excellent control of weeds such as velvet leaf, wild buckwheat, mustard, flower-of-an-hour, crab grass, and seedling Johnson grass is obtained with no observable injury to the flax.

EXAMPLE 22

5-chloro - 3 - isopropyl-6-methoxy-6-methyl-5-nitrohydrouracil is substituted for the 5,5-dichloro-6-ethoxy-3-isopropyl-6-methylhydrouracil in Example 21 above. The formulation is applied at rates of 3 pounds of active per acre as an aqueous suspension to a newly planted field of peanuts. Excellent control of such weeds as chickweed, corn cockle, mustard, velvet leaf, crabgrass, and seedling cocklebur is obtained with no observable injury to the peanuts.

EXAMPLE 23

| | Percent |
|---|---|
| 5,5-dichloro - 3-isopropyl-6-methoxy-6 - methylhydrouracil | 40 |
| 3-(3,4-dichlorophenyl)-1,1-dimethylurea | 40 |
| Alkyl aryl polyether alcohol 40% extended on a silica powder | 4 |
| Substituted acetylenic glycol | 1 |
| Partially desulfonated sodium lignin sulfonate | 2 |
| Kaolin clay | 10 |
| Synthetic fine silica | 3 |

These components are blended in a ribbon blender, micropulverized until the particles are under 50 microns in diameter, then reblended.

This formulation is added to 100 gallons of water and applied at the rate of 25 pounds of active ingredient per acre for the control of spurge, beggartick, goldenrod, broomsedge, barnyard grass, crabgass, and love grass growing in lumber yards. This treatment gives excellent kill of foliage and has extended residual activity in the soil.

EXAMPLE 24

| | |
|---|---|
| 3-sec-butyl-5,5-dichloro-6-methoxy-6-methylhydrouracil | 32.00 |
| 2-chloro-4-ethylamino - 6 - isopropylamino-s-triazine | 48.00 |
| Alkyl naphthalene sulfonic acid | 1.75 |
| Methyl cellulose | 0.25 |
| Attapugite clay | 18.00 |

These components are blended in a ribbon blender, micropulverized until the particles are under 50 microns in diameter, then reblended.

This formulation is applied in 125 gallons of water at the rate of 21 pounds of active ingredients per acre for the control of broadleaf and grass species growing along ditch banks. A spring application to vigorous growing weeds gives outstanding control of bromegrass, ryegrass, crabgrass, quackgrass, common ragweed, speedwells, broadleaf plantain, oxeye daisy, and dandlelion.

EXAMPLE 25

| | Percent |
|---|---|
| 5,5-dibromo - 6 - hydroxy-3-isopropyl-6-methylhydrouracil | 50 |
| 5-bromo-3-sec-butyl-6-methyluracil | 25 |
| Oleyl ester of sodium isothionate | 1 |
| Alkyl naphthalene sulfonic acid, Na salt | 1 |
| Kaolin clay | 20 |
| Synthetic fine silica | 3 |

These components are blended in a ribbon blender, micropulverized until the particles are under 50 microns in diameter, then reblended.

This formulation is used for the control of weeds around telephone poles. When used at rates of 15 to 25 pounds of active ingredient per acre in 100 gallons of water, good control of goldenrod, pigeon pea, crabgrass, foxtail, barnyard grass, pigweed, chickweed, and carpetweed is obtained.

EXAMPLE 26

| | Percent |
|---|---|
| 3 - cyclohexyl-5,5 - dichloro-6-methoxy-6-methylhydrouracil | 15.0 |
| 3-(3,4-dichlorophenyl)-1-methyl-1-n-butylurea | 15.0 |
| Modified polyacrylic acid, Na salt | 0.4 |
| Low viscosity polyvinyl alcohol | 1.0 |
| Water | 68.6 |

These components are wet-milled until the particle diameters are under 5 microns.

This formulation is applied to lawn areas at a rate of 4 pounds of active ingredients per acre. Crabgrass, annual bluegrass, chickweed, pigweed, foxtail, and white clover is controlled selectively without injury to established Bermuda grass.

EXAMPLE 27

| | Percent |
|---|---|
| 3-sec-butyl-5,5-dichloro-6-ethoxy-6-methylhydrouracil | 30.0 |
| Lignin sulfonates, Ca, Mg salts | 10.0 |
| Bentonite (swelling type) | 2.0 |
| Sodium pentachlorophenate | 1.0 |
| Disodium hydrogen phosphate | 1.0 |
| Water | 56.0 |

The components are sand-milled until the particle diameters are under 5 microns.

This formulation may be extended with water and sprayed to control weeds growing along a right of way. When used at the rate of 25 pounds per acre in the spring, excellent control of such weeds as crabgrass, annual bluegrass, chickweed, pigweed, and foxtail is obtained.

EXAMPLE 28

| | Percent |
|---|---|
| 6-butoxy-5,5-dichloro-6-methyl-3-phenylhydrouracil | 40 |
| 2,4,5-trichlorophenoxy acetic acid propylene glycol butyl ether ester | 10 |
| Mixed polyoxyethylated sorbitan monooleate and ethylene diamine dodecyl benzene sulfonate | 5 |
| Synthetic fine silica | 45 |

These ingredients are blended, micropulverized, and reblended.

The resulting oil dispersible powder is used for maintaining weed-free areas along electric power line rights of way. An application of 18 pounds of active ingredient per acre in 60 gallons of diesel oil gives excellent control of purple top, crabgrass, poison ivy, blackberry, honeysuckle, butter and eggs, and horse nettle.

EXAMPLE 29

| | Percent |
|---|---|
| 5,6-dimethyl-3-isopropylhydrouracil | 3.3 |
| 1,1-dimethyl-3-phenylurea | 6.7 |
| California Ca, Mg sub-bentonite | 75.0 |
| Anhydrous sodium sulfate | 15.0 |

These components are blended, micropulverized, pug-milled with about 20% water, moist granulated, dried and screened to 15–30 mesh granules.

The composition is applied by hand around isolated clumps of brush, using 2 teaspoonsful of material per clump. Oak seedling, maple seedlings, willow trees, winged elm and sweet gum are controlled.

EXAMPLE 30

| | Percent |
|---|---|
| 5,5-dichloro-6-ethoxy-3-isopropyl-6 - methylhydrouracil | 15 |
| 2,3,6-trichlorobenzoic acid, Na salt | 5 |
| Anhydrous sodium sulfate | 10 |
| California sub-bentonite | 70 |

These ingredients are blended and micropulverized until the particles are under 50 microns in diameter. The blend is then pug-milled with 15–20% water and extruded through 1/8-inch to 9/64-inch holes. These extrusions are cut into 1/8-inch lengths and dried.

This formulation is useful for controlling perennial and woody vines.

An application of 20 pounds of active ingredient per acre gives excellent control of broomsedge, Indian grass, purple top, Virginia creeper, annual bindweed and isolated clumps of honeysuckle.

EXAMPLE 31

Twelve pounds of 5-chloro-3-isopropyl-6-methoxy-6-methyl-5-nitrohydrouracil as an 80% wettable powder and 3 pounds of 4,6-dinitro-ortho-sec-butylphenol in 4 gallons of emulsifiable oil are blended as a tank mix and applied at the rate of 15 pounds of active ingredient per acre in 80 gallons of water to annual and perennial weeds growing along a fence row. Good kill with excellent residual weed control is obtained.

2,2-dischloropropionic acid, sodium salt (85%) at 15 pounds per acre or ammonium sulfamate at 35 pounds per acre can be substituted for 4,6-dinitro-ortho-sec-butylphenol with satisfactory results.

EXAMPLE 32

3-sec-butyl-5,5-dichloro-6-methoxy - 6-methylhydrouracil is tank mixed with herbicidal oil at a concentration of 12 pounds per 100 gallons to form a homogeneous solution which is then sprayed on mixed weeds on a railroad right of way. When applied at the rate of 12 pounds active per acre quick kill of red sorrel, lovegrass, quackgrass, pigweed, plantain, and sweet clover is obtained. Re-establishment of seedling weeds is effectively delayed.

The compounds listed under Example 15 can be used in like manner.

EXAMPLE 33

| | Percent |
|---|---|
| 3-sec-butyl-5,5-dichloro-6-methoxy-6 - methylhydrouracil | 99.0 |
| Trimethylnonyl polyethylene glycol ether | 1.0 |

The ingredients are mixed in a ribbon blendor and then micropulverized through a coarse screen.

Any of the compounds of this invention can be formulated in the same manner. The resulting high-strength composition can be used in place of the technical hydrouracil in any of the formulation examples.

I claim:
1. A compound selected from
   (a) compounds of the formula

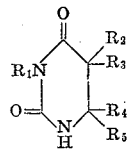

wherein
$R_1$ is selected from the group consisting of alkyl of 3 through 6 carbon atoms, cycloalkyl of 3 through 12 carbon atoms, optionally substituted with a substituent selected from the group consisting of alkyl of 1 through 4 carbon atoms, methoxy, chlorine, and bromine, cycloalkyl of 4 through 13 carbon atoms, optionally substituted with a substituent selected from the group consisting of alkyl of 1 through 4 carbon atoms, methoxy, chlorine, and bromine;

$R_2$ is selected from the group consisting of chlorine, bromine, fluorine, nitro, methyl, ethyl, hydroxymethyl, methoxymethyl, ethoxymethyl, methoxy, and hydrogen;

$R_3$ is selected from the group consisting of chlorine and bromine;

$R_4$ is selected from the group consisting of alkoxy of 1 through 6 carbon atoms, and haloalkoxy of 1 through 6 carbon atoms; and $R_5$ is selected from the group consisting of methyl and ethyl; and (b) phenol complexes of the compounds of (a) having the formula

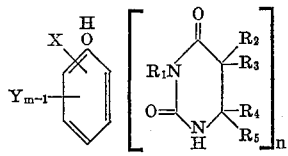

wherein $R_1$, $R_2$, $R_3$, $R_4$, and $R_5$ are as defined above,

X is selected from the group consisting of hydrogen, chlorine, bromine, nitro, alkyl of 1 through 3 carbon atoms, and alkoxy of 1 through 3 carbon atoms, Y is selected from the group consisting of chlorine and alkyl of 1 through 3 carbon atoms, m is a whole number 1 through 5, and n is selected from the group consisting of 1 and 2.

2. 5,5-dichloro-3-isopropyl-6-methoxy-6-methylhydrouracil.
3. 5,5-dichloro-3-isopropyl-6-ethoxy-6-methylhydrouracil.
4. 5,5-dichloro-3-cyclohexyl-6-methoxy-6-methylhydrouracil.
5. 3-sec-butyl-5,5-dichloro-6-methoxy-6-methylhydrouracil.
6. 3-sec-butyl-5,5-dichloro-6-ethoxy-6-methylhydrouracil.
7. 3-tert-butyl-5,5-dichloro-6-methoxy-6-methylhydrouracil.
8. 5,5-dichloro-6-methoxy-6-methyl-3-(3-pentyl)hydrouracil.
9. 5,5-dichloro-6-ethoxy-6-methyl-3-phenylhydrouracil.

No references cited.

NICHOLAS S. RIZZO, *Primary Examiner.*

F. A. MIKA, *Assistant Examiner.*

UNITED STATES PATENT OFFICE
CERTIFICATE OF CORRECTION

Patent No. 3,360,523　　　　　　　　　　　　　December 26, 1967

Harvey M. Loux

It is hereby certified that error appears in the above numbered patent requiring correction and that the said Letters Patent should read as corrected below.

Column 32, line 65, for "cycloalkyl" read -- cycloalkyl alkyl --.

Signed and sealed this 21st day of January 1969.

(SEAL)
Attest:

Edward M. Fletcher, Jr.　　　　　　　　　　　EDWARD J. BRENNER
Attesting Officer　　　　　　　　　　　　　　Commissioner of Patents